(12) United States Patent
Garitz et al.

(10) Patent No.: US 10,870,508 B2
(45) Date of Patent: Dec. 22, 2020

(54) DEVICE, IN PARTICULAR FOR CLOSING A TOP PORTION OF A FOOD CONTAINER, CONSISTING OF A LAMINATE WITH A PEELED AND FOLDED-BACK EDGE REGION

(71) Applicant: SIG Technology AG, Neuhausen (CH)

(72) Inventors: Norbert Garitz, Julich (DE); Olivier Peterges, Eupen (BE); Thomas Vetten, Dusseldorf (DE); Ulrich Alef, Wegberg (DE)

(73) Assignee: SIG Technology AG, Neuhausen (CH)

( * ) Notice: Subject to any disclaimer, the term of this patent is extended or adjusted under 35 U.S.C. 154(b) by 747 days.

(21) Appl. No.: 15/523,301

(22) PCT Filed: Oct. 22, 2015

(86) PCT No.: PCT/EP2015/074531
§ 371 (c)(1),
(2) Date: Feb. 13, 2018

(87) PCT Pub. No.: WO2016/066530
PCT Pub. Date: May 6, 2016

(65) Prior Publication Data
US 2019/0233150 A1    Aug. 1, 2019

(30) Foreign Application Priority Data
Oct. 31, 2014   (DE) .................. 10 2014 015 958

(51) Int. Cl.
*B65B 43/10*         (2006.01)
*B65B 51/30*         (2006.01)
(Continued)

(52) U.S. Cl.
CPC .............. *B65B 43/10* (2013.01); *B29C 65/08* (2013.01); *B29C 65/1674* (2013.01);
(Continued)

(58) Field of Classification Search
CPC ....... B65B 51/10; B65B 51/14; B65B 51/144; B65B 51/225; B65D 75/26; B29C 66/135; B29C 66/346; B29C 66/43122
(Continued)

(56) References Cited

U.S. PATENT DOCUMENTS 2,268,668 A * 1/1942 Moore .................. B65D 75/26
493/84
2,322,654 A * 6/1943 Moore .................. B65D 75/26
383/210
(Continued)

FOREIGN PATENT DOCUMENTS

DE         3316238 C1    12/1984
DE        10027735 C1    10/2001
(Continued)

OTHER PUBLICATIONS

European Patent Office, International Search Report, dated Apr. 19, 2016.
(Continued)

*Primary Examiner* — Stephen F. Gerrity
(74) *Attorney, Agent, or Firm* — Taft Stettinius & Hollister LLP

(57) ABSTRACT

A device comprising a first fixing element, a further fixing element, and a folded planar composite is disclosed. The first fixing element comprises a first fixing surface and the further fixing element comprises a further fixing surface. The folded planar composite is at least partially fixed between the first fixing surface and the further fixing surface. The folded planar composite comprises a first composite region and a further composite region.

22 Claims, 9 Drawing Sheets

(51) Int. Cl.
*B65B 51/14* (2006.01)
*B29C 65/08* (2006.01)
*B29C 65/16* (2006.01)
*B29C 65/00* (2006.01)
*B65D 5/42* (2006.01)
*B29C 65/82* (2006.01)
*B32B 15/08* (2006.01)
*B32B 15/12* (2006.01)
*B65D 5/06* (2006.01)
*B65D 65/40* (2006.01)
*B29L 31/00* (2006.01)
*B29C 65/14* (2006.01)
*B29K 705/02* (2006.01)
*B29C 65/10* (2006.01)

(52) U.S. Cl.
CPC ........ *B29C 65/8253* (2013.01); *B29C 66/112* (2013.01); *B29C 66/1122* (2013.01); *B29C 66/135* (2013.01); *B29C 66/346* (2013.01); *B29C 66/43122* (2013.01); *B29C 66/71* (2013.01); *B29C 66/7234* (2013.01); *B29C 66/72321* (2013.01); *B29C 66/72341* (2013.01); *B29C 66/73115* (2013.01); *B29C 66/8122* (2013.01); *B29C 66/81417* (2013.01); *B29C 66/81422* (2013.01); *B29C 66/849* (2013.01); *B29C 66/9513* (2013.01); *B29C 66/9517* (2013.01); *B32B 15/08* (2013.01); *B32B 15/12* (2013.01); *B65B 51/144* (2013.01); *B65B 51/30* (2013.01); *B65B 51/303* (2013.01); *B65D 5/067* (2013.01); *B65D 5/4279* (2013.01); *B65D 65/40* (2013.01); *B29C 65/10* (2013.01); *B29C 65/1406* (2013.01); *B29C 65/1412* (2013.01); *B29C 65/1425* (2013.01); *B29C 65/1616* (2013.01); *B29C 65/1619* (2013.01); *B29K 2705/02* (2013.01); *B29L 2031/7166* (2013.01); *B32B 2307/7244* (2013.01); *B32B 2439/70* (2013.01)

(58) Field of Classification Search
USPC ..... 53/477, 479, 373.7, 374.2, 374.8, 375.9; 156/73.1, 580.1, 580.2, 581
See application file for complete search history.

(56) References Cited

U.S. PATENT DOCUMENTS

| | | | | |
|---|---|---|---|---|
| 2,333,330 A | * | 11/1943 | Moore | B65D 75/26 493/189 |
| 2,550,520 A | * | 4/1951 | Bennett | B65D 75/26 229/198.2 |
| 3,506,516 A | | 4/1970 | Baumann | |
| 3,604,317 A | * | 9/1971 | Baun | B29C 66/135 493/287 |
| 3,956,046 A | * | 5/1976 | Tsuchiya et al. | B29C 65/08 156/73.4 |
| 4,159,220 A | | 6/1979 | Bosche | |
| 4,239,150 A | * | 12/1980 | Schadowski et al. | B65D 5/4279 229/198.2 |
| 5,385,527 A | * | 1/1995 | Fukada et al. | B29C 66/135 493/135 |
| 5,671,882 A | * | 9/1997 | Cerwinski et al. | B65D 75/26 229/87.08 |
| 5,810,243 A | * | 9/1998 | DiPinto et al. | B65D 5/4279 229/198.2 |
| 6,110,548 A | | 8/2000 | Kinsey | |
| 6,554,182 B1 | * | 4/2003 | Magnusson et al. | B65D 5/4279 229/125.42 |
| 6,605,178 B1 | * | 8/2003 | Shinohara et al. | B29C 65/08 156/379.6 |
| 2004/0011007 A1 | | 1/2004 | Kohl et al. | |
| 2012/0097339 A1 | * | 4/2012 | Hull | B29C 65/08 156/580.1 |

FOREIGN PATENT DOCUMENTS

| | | | | |
|---|---|---|---|---|
| DE | 102006045338 A1 | * | 4/2008 | ............ B29C 65/08 |
| DE | 102006045338 A1 | | 4/2008 | |
| DE | 102007060442 A1 | | 6/2009 | |
| EP | 0337010 B1 | | 10/1989 | |
| EP | 1241100 A1 | | 9/2002 | |
| EP | 0857103 B1 | | 1/2003 | |
| EP | 2532594 E1 | | 1/2014 | |
| JP | 62151323 A | * | 7/1987 | ........... B29C 66/723 |
| JP | S63147408 U | | 9/1988 | |
| JP | H01235566 A | | 9/1989 | |
| JP | 3004786 U | * | 11/1994 | ............ B29C 65/08 |
| JP | 11500374 A | | 1/1999 | |
| JP | 2002347709 A | | 12/2002 | |
| JP | 2006056182 A | | 3/2006 | |
| JP | 2010260619 A | | 11/2010 | |
| JP | 2012254818 A | | 12/2012 | |
| WO | 9009926 A2 | | 9/1990 | |
| WO | 0194234 A1 | | 12/2001 | |
| WO | 2008102250 A1 | | 8/2008 | |
| WO | WO-2013013802 A1 | * | 1/2013 | ............ B32B 27/08 |
| WO | 2013120535 A1 | | 8/2013 | |

OTHER PUBLICATIONS

European Patent Office, Written Opinion of the International Searching Authority, dated Apr. 19, 2016.

Notification of Reasons for Refusal; Japanese Patent Application No. 2017-523354; Dispatch No. 301945; dated Jul. 23, 2019; 10 pages.

\* cited by examiner

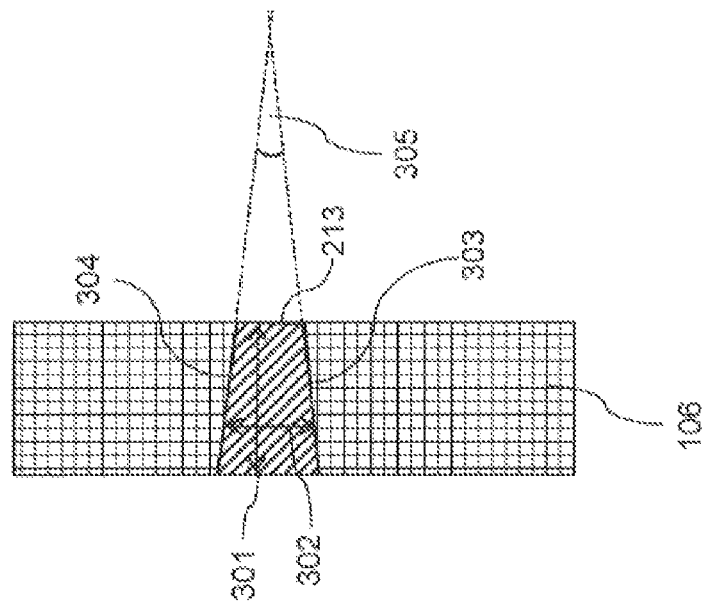
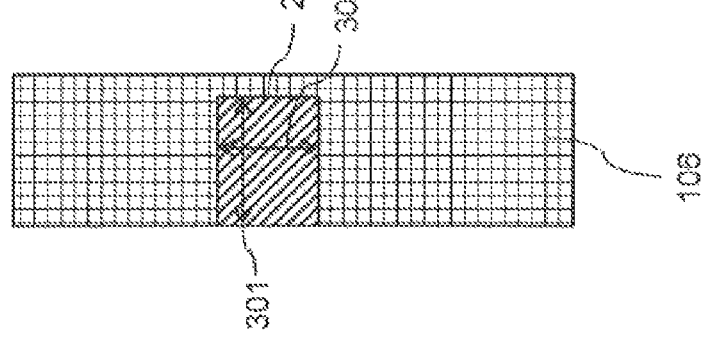
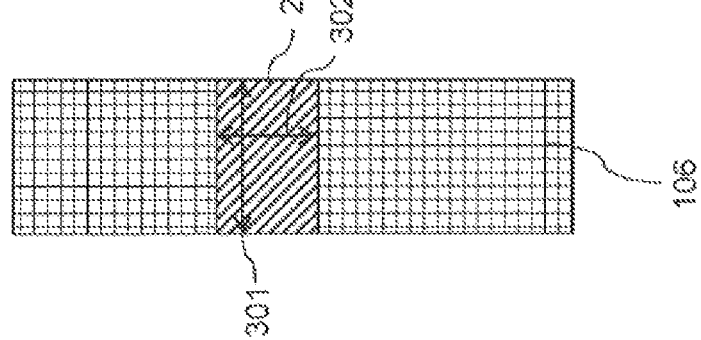

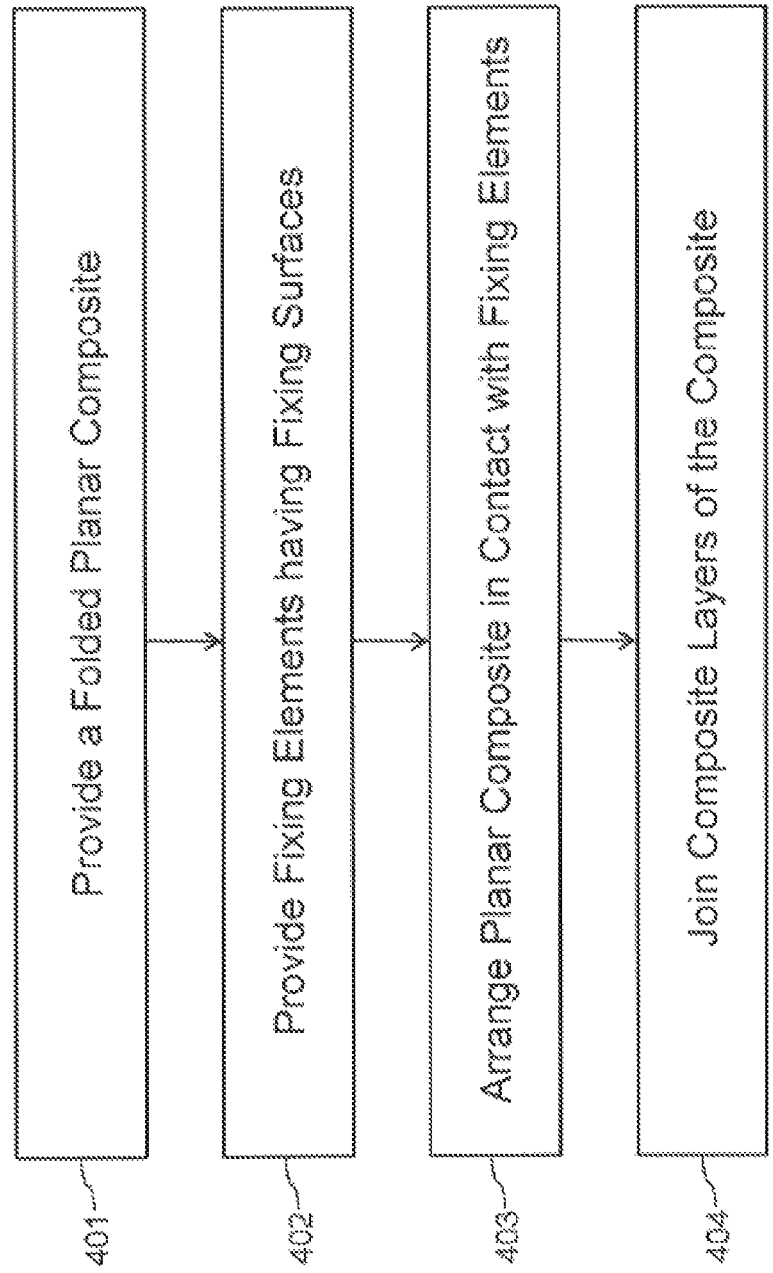

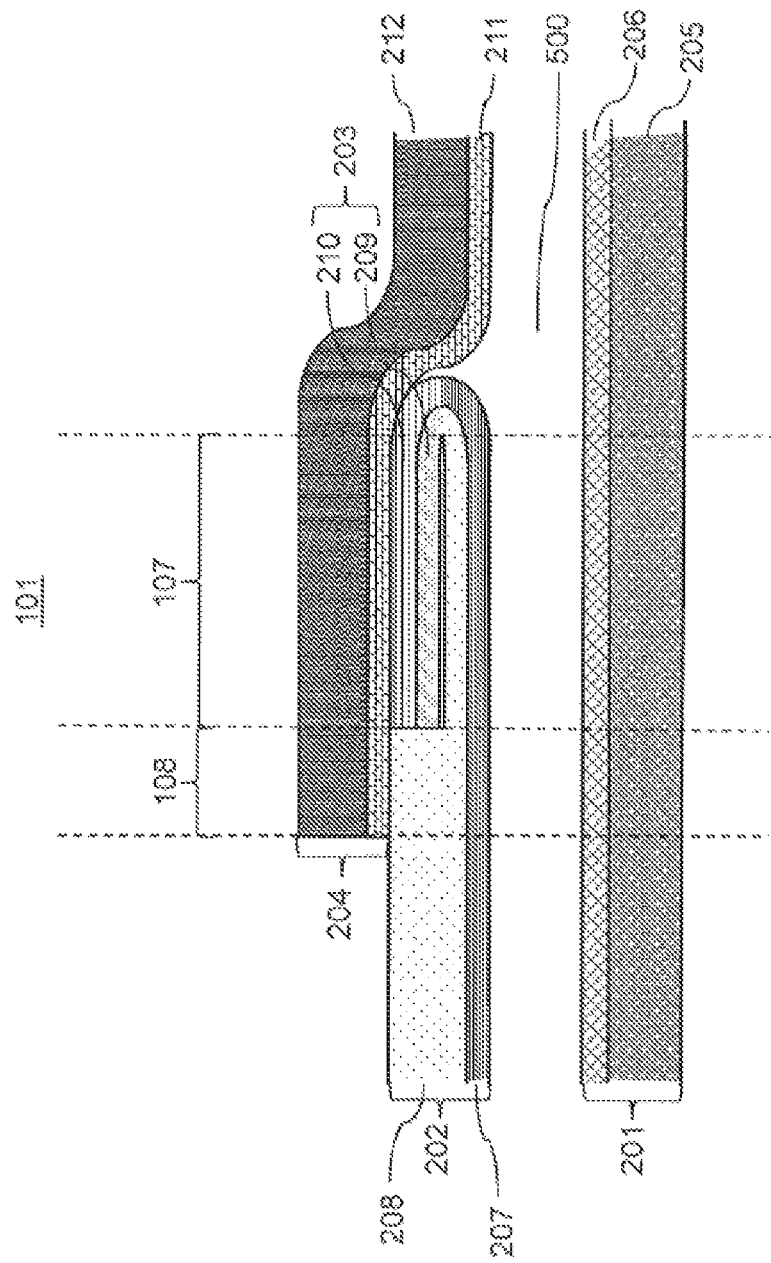

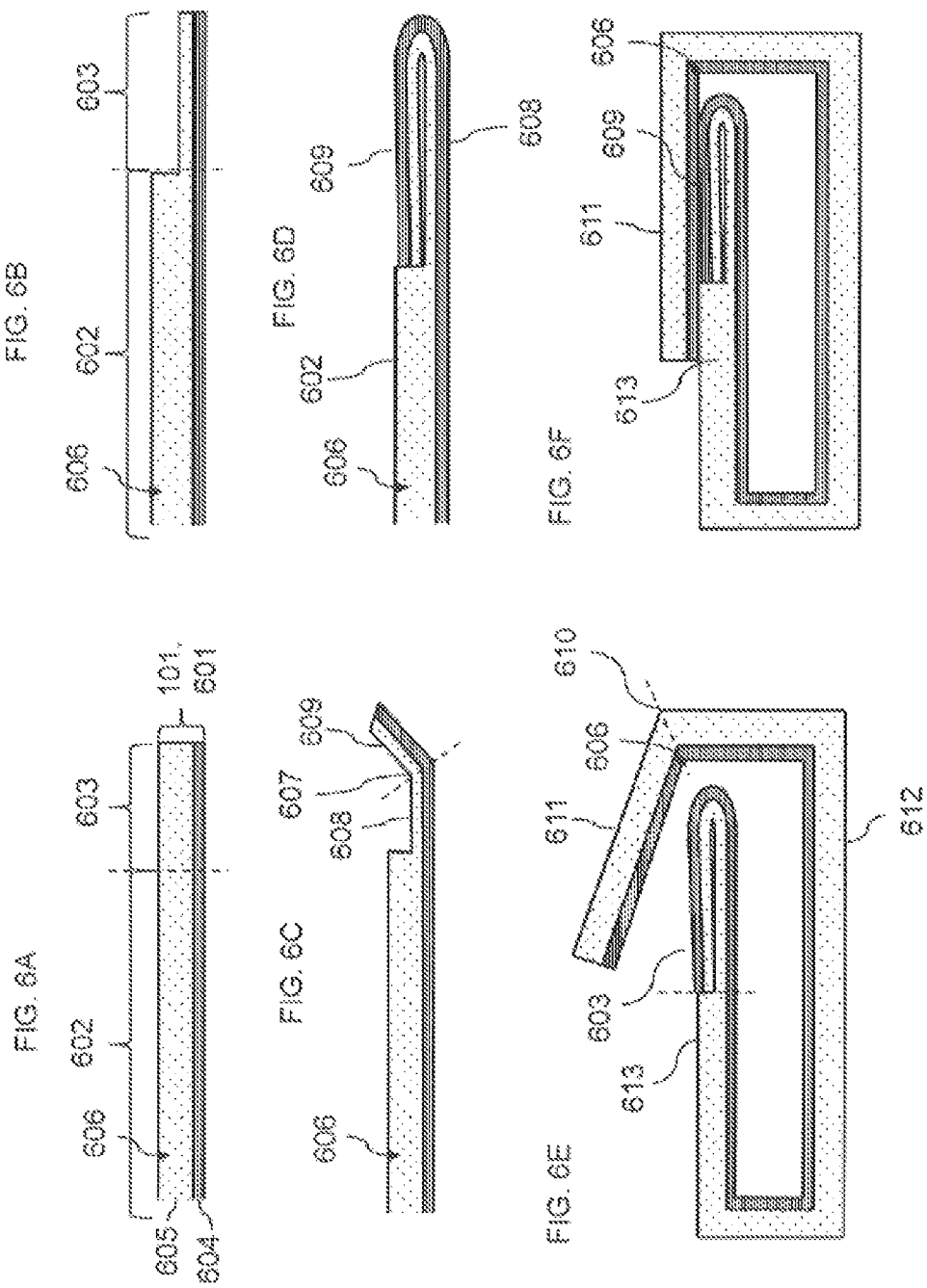

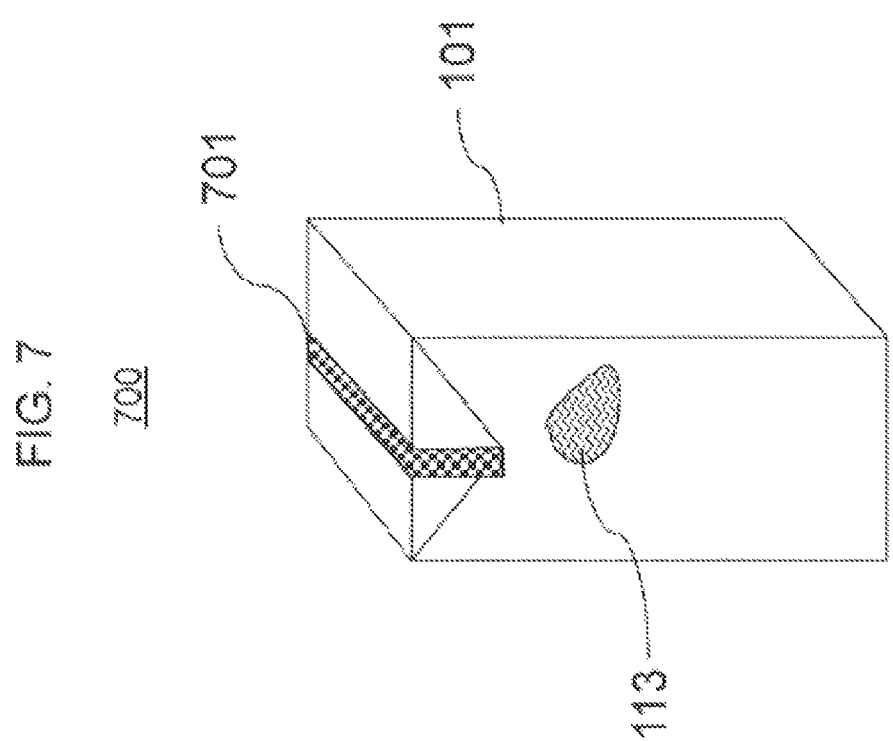

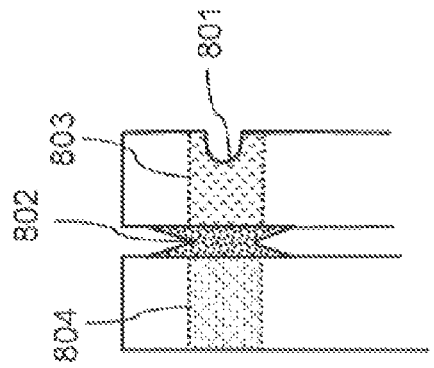
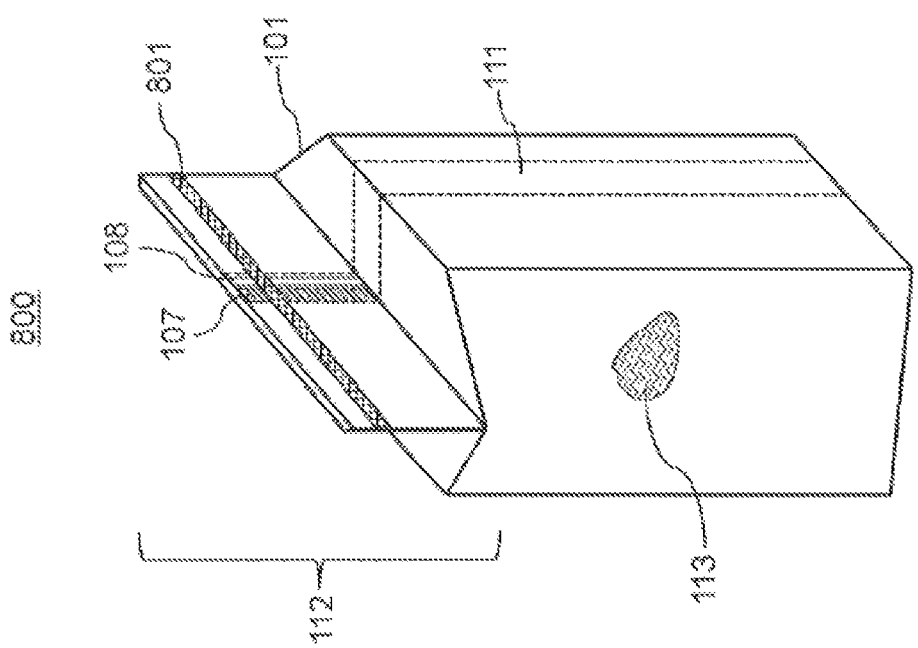

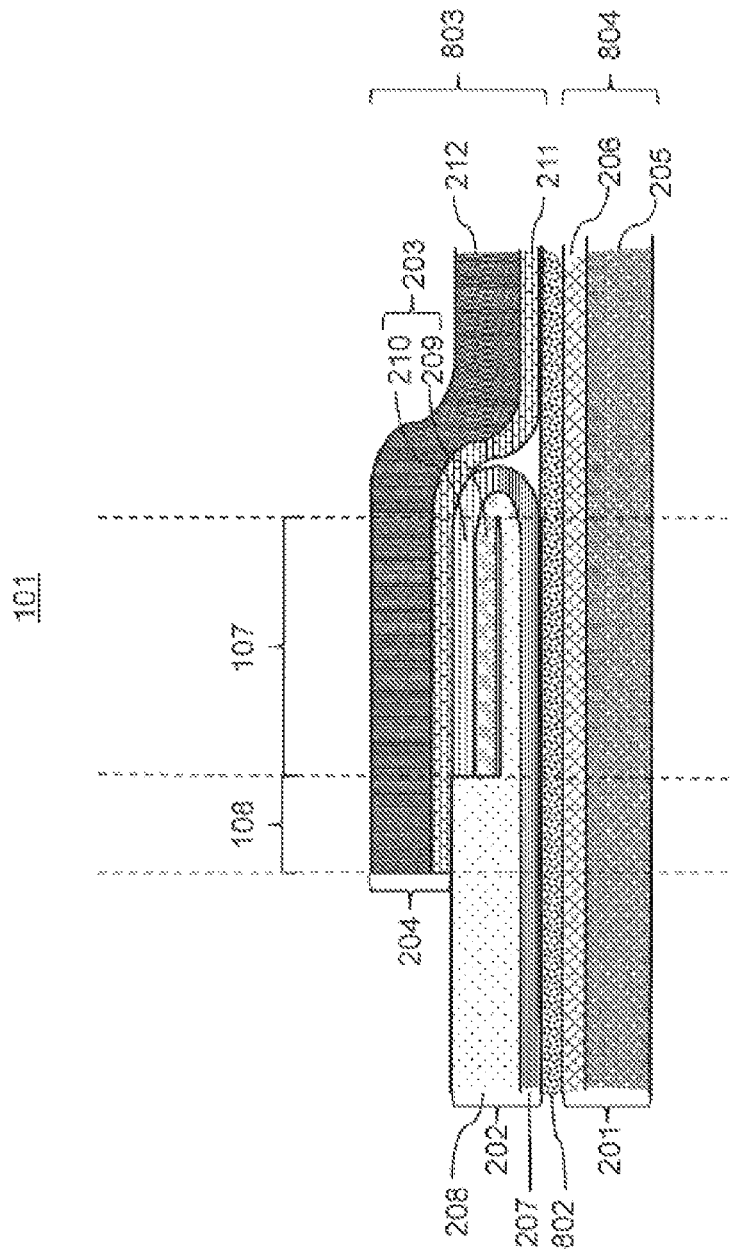

DEVICE, IN PARTICULAR FOR CLOSING A TOP PORTION OF A FOOD CONTAINER, CONSISTING OF A LAMINATE WITH A PEELED AND FOLDED-BACK EDGE REGION

CROSS-REFERENCE TO RELATED APPLICATIONS

The present application is a U.S. national stage of, and claims the priority benefit of, International Patent Application Serial No. PCT/EP2015/074531, filed Oct. 22, 2015 and also claims the priority benefit of German Patent Application Serial No. 10 2014 015 958.2, filed Oct. 31, 2014, the text and drawings of which are hereby incorporated by reference in their entireties.

The present invention relates to a device comprising a first fixing element, a further fixing element, comprising a recess, and a folded planar composite, in particular for closing a container precursor comprising the planar composite; a method for joining a first composite layer to a second composite layer of a planar composite by a first fixing element and a further fixing element, comprising a recess; a closed container obtainable by the above method; a closed container comprising a seam and a depression; and a use of the above device.

BACKGROUND

For a long time foodstuffs, whether foodstuffs for human consumption or also animal feed products, have been preserved by being stored either in a can or in a glass jar closed with a lid. The shelf life can be increased here on the one hand by disinfecting as far as possible in each case the foodstuff and the container, here the glass jar or can, separately and then filling the container with the foodstuff and closing it. However, these measures, which in themselves have been proven for a long time, for increasing the shelf life of foodstuffs have a number of disadvantages, for example a downstream sterilization which is again necessary. Because of their essentially cylindrical shape, cans and glass jars have the disadvantage that very dense and space-saving storage is not possible. Furthermore, cans and glass jars have a considerable intrinsic weight, which leads to an increased consumption of energy during transportation. A quite high consumption of energy is moreover necessary for the production of glass, tinplate or aluminium, even if the raw materials used for this originate from recycling. In the case of glass jars, an increased outlay on transportation is an added complication. The glass jars are usually prefabricated in a glassworks and must then be transported to the foodstuffs filling plant utilizing considerable transportation volumes. Glass jars and cans moreover can be opened only with a considerable application of force or with the aid of tools, and therefore rather inconveniently. In the case of cans, there is also a high risk of injury from sharp edges which arise during opening. In the case of glass jars, glass splinters are forever entering into the foodstuff during filling or opening of filled glass jars, which in the worst case can lead to internal injuries on consumption of the foodstuff. Furthermore, labels must be stuck on to both cans and glass jars for identification and advertising of the foodstuffs content. Information and advertising images cannot be printed directly on to the glass jars and cans. In addition to the actual print, a substrate for this, a paper or a suitable film, and a fixing means, an adhesive or a sealing composition, are thus necessary for this.

Other packaging systems for storing foodstuffs for a long period of time as far as possible without impairment are known from the prior art. These are containers produced from planar composites—often also called laminates. Such planar composites are often built up from a layer of thermoplastic, a carrier layer usually made of cardboard or paper, an adhesion promoter layer, a barrier layer and a further layer of plastic, as disclosed, inter alia, in WO 90/09926 A2.

These laminated containers already have many advantages over the conventional glass jars and cans. Nevertheless, possibilities for improvement also exist for these packaging systems.

Laminated containers are thus often characterised in that they are made of a laminate which has been folded several times, wherein opposite end regions of the laminate have been sealed to one another in order first to form a jacket-like or tubular precursor of a closed container. The end regions sealed to one another form a longitudinal seam here, which will also be present in the closed container. This longitudinal seam comprises both on the inside of the container and on the outside a bordering edge of the laminate at which moisture can penetrate into the layered structure of the laminate, in particular into the carrier layer, which is usually made of cardboard or paper. This must be prevented at least on the inside of the longitudinal seam, since water-containing foodstuffs are to be stored in the container. In the prior art, to this end, the laminate is skived prior to formation of the longitudinal seam in the region of what will be a bordering edge and a fold is produced in the skived region so that the skived region is folded over onto itself. Subsequently, the longitudinal seam is produced, for example by sealing. For this, the skived region which has been folded over onto itself is pressed with a further region of the laminate which has been placed on top of it by folding. The bordering edge of the longitudinal seam which is now facing the inside of the container precursor is protected against water penetration all the way around by the innermost layer of the laminate. The container precursor obtained in this way must be closed after filling, in particular in the head region. This is normally effected by pressing and sealing transverse to the longitudinal seam. Before the pressing, the longitudinal seam which is to be pressed has a thickening on the side facing away from the inside of the container precursor. This can come about either because the skived region which is folded over onto itself can be thicker than the rest of the laminate thickness, or because at least two regions of the laminate lie over one another in the region of the longitudinal seam. In order that this thickened region, which extends over the entire longitudinal seam, is not squeezed too hard and thereby damaged in the pressing, for example in the head region of the container precursor, one of the two jaws between which it is pressed must have a recess for receiving the thickening. In the prior art, the recess is quite understandably arranged in the jaw of the press which engages with the thickened side of the longitudinal seam. Surprisingly, it was found that this arrangement can be improved and the achievable leakproofness can be increased.

SUMMARY

Generally, an object of the present invention is to at least partly overcome a disadvantage which emerges from the prior art. A further object of the invention is to provide a container or a container precursor or both, wherein a seam of the container or of the container precursor, preferably a longitudinal seam, is protected, outwards or inwards or both, from moisture penetration. A further object of the invention is to provide a container which has a seam, preferably a head seam or a gable seam, with an increased leakproofness. A further object of the invention is to provide a container which has a seam, preferably a head seam or a gable seam, with less leak causing channels or discolourations or both. A further object of the invention is to provide a container, wherein the container is as water tight and gas tight as possible. A further object of the invention is to provide a container, wherein the container adulterates as little as possible a flavour of a product which the container comprises. A further object of the invention is to provide a container, wherein the container has a combination of 2 or more of the above advantages. A further object of the invention is to provide a container or a container precursor or both, wherein a production of the container or container precursor is characterised by one selected from the group consisting of a longer service life of a sealing tool, in particular a sonotrode, less development of dust, less development of noise and a longer service life of a splitting tool, or a combination of at least two of these. A further object of the invention is to provide a container or a container precursor or both, wherein as little additional joining material as possible, such as, for example, a sealing layer or an adhesive, is located between skived regions of a carrier material of the container or the container precursor lying one on the other. A further object of the invention is to provide a container or a container precursor or both, wherein there is a relatively large possibility of selection with respect to a layer thickness of a skived carrier layer of the container or the container precursor. A further object of the invention is to provide a container or a container precursor or both, wherein a skived region of a wall of the container or the container precursor is more stable or more rigid and thus more resistant or easier to process or both.

A further object of the invention is to provide a method for producing containers, wherein a lower proportion of reject containers, in particular containers with insufficient leakproofness, can be produced by the method. A further object of the invention is to provide a method for producing containers, wherein the method is simpler or faster or both. A further object of the invention is to provide a method for producing containers, wherein preferably in the head region of the container sealing which is as liquid- and gas-tight as possible is achieved. A further object of the invention is to provide a method for producing containers, wherein a service life of a sealing tool is improved. A further object of the invention is to provide a method for producing containers, wherein, preferably in the head region of the container, discolouration of container layers by sealing, in particular burning of container layers, is avoided as far as possible. A further object of the invention is to provide a method for producing containers, wherein preferably in the head region of the container, during sealing and pressing, container layers are pressed together as uniformly as possible. A further object of the invention is to provide a method for producing containers, wherein the method has a combination of 2 or more of the above advantages.

A contribution towards at least partially fulfilling at least one of the above objects is made by the independent claims. The dependent claims provide preferred embodiments which contribute towards at least partially fulfilling at least one of the objects.

A contribution to achieving at least one of the objects according to the invention is made by an embodiment 1 of a device 1 comprising a first fixing element, a further fixing element and a folded planar composite; wherein the first fixing element comprises a first fixing surface and the further fixing element comprises a further fixing surface; wherein the folded planar composite is at least partially fixed between the first fixing surface and the further fixing surface; wherein the folded planar composite comprises a first composite region and a further composite region; wherein the first composite region comprises a first layer sequence, comprising, as layers superimposing one another in the direction from the further fixing surface to the first fixing surface, a first composite layer, a second composite layer, a third composite layer and a fourth composite layer; wherein, in the first composite region, the third composite layer is joined to the fourth composite layer; wherein the further composite region comprises a further layer sequence, comprising, as layers superimposing one another in the direction from of the further fixing surface to the first fixing surface, the first composite layer, the second composite layer and the fourth composite layer; wherein, in the further composite region, the second composite layer is joined to the fourth composite layer; wherein the further composite region is adjacent to the first composite region; wherein the first composite layer comprises a first carrier layer; wherein the second composite layer comprises a second carrier layer; wherein the third composite layer comprises a third carrier layer; wherein the fourth composite layer comprises a fourth carrier layer; wherein, in the first composite region, the first carrier layer or the fourth carrier layer or each of both is characterised by a greater layer thickness than the second carrier layer or the third carrier layer or each of both; wherein in the further composite region, the second carrier layer is characterised by a greater layer thickness than in the first composite region; wherein the further fixing surface comprises a recess; wherein the first composite region and the further composite region are each at least partially located between the recess and the first fixing surface.

An embodiment 2 of the device 1 according to the invention is constructed according to the embodiment 1, wherein the first composite layer comprises, as first composite layer sequence in the direction from the further fixing surface to the first fixing surface, the first carrier layer and a first barrier layer; wherein the second composite layer comprises as second composite layer sequence, in the direction from the further fixing surface to the first fixing surface, a second barrier layer and the second carrier layer; wherein the third composite layer comprises as third composite layer sequence, in the direction from the further fixing surface to the first fixing surface, the third carrier layer and a third barrier layer; wherein the fourth composite layer comprises as fourth composite layer sequence, in the direction from the further fixing surface to the first fixing surface, a fourth barrier layer and the fourth carrier layer.

An embodiment 3 of the device 1 according to the invention is constructed according to one of the preceding embodiments, wherein the first fixing element or the further fixing element or both is a sonotrode. Preferably, the first fixing element is a sonotrode. In this case, the further fixing element is preferably an anvil for the sonotrode. If the device according to the invention is employed in a continuous process, the first fixing element and the further fixing element are preferably sonotrodes.

An embodiment 4 of the device 1 according to the invention is constructed according to embodiment 3, wherein the sonotrode comprises, preferably consists of, one selected from the group consisting of an alloy, comprising at least 90 wt.-%, preferably at least 93 wt.-%, more preferably at least 95 wt.-%, titanium or aluminium or both, based on the weight of the alloy; a steel; and a piezo-ceramic or a combination of at least two thereof. A preferred steel is a sinter steel.

An embodiment 5 of the device 1 according to the invention is constructed according to one of the preceding embodiments, wherein the first composite region is characterised by a first width; wherein the first width is in a range from 1 to 10 mm, preferably from 2 to 9 mm, more preferably from 3 to 8 mm, more preferably from 3 to 7 mm, most preferably from 4 to 6.5 mm.

An embodiment 6 of the device 1 according to the invention is constructed according to one of the preceding embodiments, wherein the further composite region is characterised by a further width; wherein the further width is in a range from 1 to 10 mm, preferably from 2 to 9 mm, more preferably from 3 to 8 mm, more preferably from 3 to 7 mm, most preferably from 4 to 6.5 mm.

An embodiment 7 of the device 1 according to the invention is constructed according to one of the preceding embodiments, wherein the recess has a length in the direction of a circumference of the further fixing element; wherein a width of the recess becomes less along the circumference.

An embodiment 8 of the device 1 according to the invention is constructed according to one of the preceding embodiments, wherein the recess is bordered on opposing sides of the recess by a first edge and a further edge; wherein the first edge comprises a straight first edge section; wherein the further edge comprises a straight further edge section; wherein the straight first edge section and the straight further edge section confine an angle in a range from 5 to 30°, preferably from 5 to 25°, more preferably from 5 to 20°, most preferably from 10 to 20°.

An embodiment 9 of the device 1 according to the invention is constructed according to one of the preceding embodiments, wherein, in the first composite region, the layer thickness of the first carrier layer or of the fourth carrier layer or each of both is each 1.1 to 20 times, preferably 1.1 to 15 times, more preferably 1.1 to 10 times, more preferably 1.1 to 5 times, more preferably 1.1 to 3 times, more preferably 1.1 to 2.5 times, more preferably 1.2 to 2.4 times, even more preferably 1.2 to 2.4 times, most preferably 1.3 to 2.3 times, as large as the layer thickness of the second carrier layer or of the third carrier layer or each of both.

An embodiment 10 of the device 1 according to the invention is constructed according to one of the preceding embodiments, wherein in the further composite region, the layer thickness of the second carrier layer is 1.1 to 20 times, preferably 1.1 to 15 times, more preferably 1.1 to 10 times, more preferably 1.1 to 5 times, more preferably 1.1 to 3 times, more preferably 1.1 to 2.5 times, more preferably 1.2 to 2.4 times, even more preferably 1.2 to 2.4 times, most preferably 1.3 to 2.3 times, as great as the layer thickness of this second carrier layer in the first composite region.

An embodiment 11 of the device 1 according to the invention is constructed according to one of the preceding embodiments, wherein, in the first composite region, the second composite layer is not joined to the third composite layer. Preferably, the second composite layer and the third composite layer in the first composite region are contacted but not joined. Preferably, in the first composite region, at least 20%, more preferably at least 30%, more preferably at least 40%, more preferably at least 50%, more preferably at least 60%, more preferably at least 70%, even more preferably at least 80%, even more preferably at least 90%, most preferably at least 95%, of one of the surfaces of the second composite layer facing the third composite layer is contacted with, and preferably not joined to, the third composite layer. Further preferably, the second composite layer and the third composite layer are held together in such a way that they are joined together in at least one composite region adjacent to the first composite region. Preferably, the second composite layer in the above mentioned adjacent composite region continues over into the third composite layer at a fold. In the first composite region, the second composite layer can in a further embodiment be neither joined to nor in contact with the third composite layer. In a further embodiment according to the invention, the second composite layer and the third composite layer in the first composite region are joined to each other, preferably over at least 20%, more preferably at least 30%, more preferably at least 40%, more preferably at least 50%, more preferably at least 60%, more preferably at least 70%, even more preferably at least 80%, even more preferably at least 90%, most preferably at least 95%, of a surface of the second composite layer facing the third composite layer. In this connection, the second composite layer and the third composite layer in the first composite region are preferably pressed together or sealed together or both.

An embodiment 12 of the device 1 according to the invention is constructed according to one of the preceding embodiments, wherein, in the first composite region,
  a) a surface of the second carrier layer facing the third carrier layer, and
  b) a surface of the third carrier layer facing the second carrier layer
each comprises no top layer, preferably no "coat", and is joined to no top layer, preferably to no "coat".

An embodiment 13 of the device 1 according to the invention is constructed according to one of the preceding embodiments, wherein one selected from the group consisting of the first carrier layer, the second carrier layer, the third carrier layer and the fourth carrier layer, or a combination of at least two thereof comprises one selected from the group consisting of cardboard, pasteboard, and paper or a combination of at least two thereof. Preferably, one selected from the group consisting of the first carrier layer, the second carrier layer, the third carrier layer and the fourth carrier layer, or a combination of at least two thereof consists of one selected from the group consisting of cardboard, pasteboard and paper or a combination of at least two thereof.

An embodiment 14 of the device 1 according to the invention is constructed according to one of the embodiments 2 to 13, wherein one selected from the group consisting of the first barrier layer, the second barrier layer, the third barrier layer and the fourth barrier layer, or a combination of at least two thereof comprises aluminium or a barrier plastic or both. Preferably, one selected from the group consisting of the first barrier layer, the second barrier layer, the third barrier layer and the fourth barrier layer, or a combination of at least two thereof consists of aluminium or a barrier plastic or both.

An embodiment 15 of the device 1 according to the invention is constructed according to one of the preceding embodiments, wherein the folded planar composite is a container precursor surrounding an interior.

An embodiment 16 of the device 1 according to the invention is constructed according to embodiment 15, wherein the container precursor comprises a foodstuff.

An embodiment 17 of the device 1 according to the invention is constructed according to one of the preceding embodiments, wherein the folded planar composite is constructed in one piece.

An embodiment 18 of the device 1 according to the invention is constructed according to one of the preceding embodiments, wherein the recess has a depth in a range from 0.1 to 5 mm, preferably from 0.1 to 4 mm, more preferably from 0.1 to 3 mm, more preferably from 0.1 to 2 mm, more preferably from 0.1 to 1 mm, most preferably from 0.2 to 0.5 mm.

A contribution to achieving at least one of the objects according to the invention is made by an embodiment 1 of a method 1 comprising as method steps
a) provision of a folded planar composite,
   wherein the folded planar composite comprises a first composite layer, a second composite layer, a third composite layer, a fourth composite layer, a first composite region and a further composite region;
   wherein an intermediate region is located between the first composite layer and the second composite layer;
   wherein the first composite layer comprises a first carrier layer;
   wherein the second composite layer comprises a second carrier layer;
   wherein the third composite layer comprises a third carrier layer;
   wherein the fourth composite layer a comprises fourth carrier layer;
   wherein the first composite region comprises a first layer sequence, comprising as layers superimposing one another in the direction from the intermediate region through the first layer sequence, the second composite layer, the third composite layer and the fourth composite layer;
   wherein, in the first composite region, the third composite layer is joined to the fourth composite layer;
   wherein, in the first composite region, the first carrier layer or the fourth carrier layer or each of both is characterised by a greater layer thickness than the second carrier layer or the third carrier layer or each of both;
   wherein the further composite region comprises a further layer sequence, comprising as layers superimposing one another in the direction from the intermediate region through the further layer sequence, the second composite layer and the fourth composite layer;
   wherein, in the further composite region, the second composite layer is joined to the fourth composite layer;
   wherein, in the further composite region, the second carrier layer is characterised by a greater layer thickness than in the first composite region;
b) provision of a first fixing element, comprising a first fixing surface, and a further fixing element, comprising a further fixing surface;
   wherein the further fixing surface comprises a recess;
c) contacting the fourth composite layer with the first fixing surface, the first composite layer with the further fixing surface, and the first composite layer with the secand composite layer;
   wherein the first composite region and the further composite region are each at least partially located between the recess and the first fixing surface; and
d) joining the first composite layer to the second composite layer.

An embodiment 2 of the method 1 according to the invention is constructed according to embodiment 1, wherein in method step d), the first fixing surface or the further fixing surface or both vibrate against the planar composite with
   a) a frequency in a range from 10 to 50 kHz, preferably from 10 to 45 kHz, more preferably from 10 to 40 kHz, more preferably from 15 to 35 kHz, most preferably from 20 to 35 kHz, or
   b) an amplitude in a range from 3 to 20 µm, preferably from 4 to 18 µm, more preferably from 5 to 16 µm, more preferably from 6 to 15 µm, most preferably from 6.5 to 13.3 µm, or
   c) both.

Preferably, the above feature a) or b) or c) applies to the first fixing element. Preferably, the first fixing element is a sonotrode.

Embodiment 3 of the method 1 according to the invention is constructed according to embodiment 1 or 2, wherein, in method step d), the joining is a sealing by transferring an ultrasonic vibration from the first fixing element or the further fixing element or both to the folded planar composite.

An embodiment 4 of the method 1 according to the invention is constructed according to embodiment 3, wherein the ultrasonic vibration is excited for a period in a range from 50 to 500 ms, preferably from 70 to 460 ms, more preferably from 90 to 420 ms, more preferably from 110 to 360 ms, more preferably from 130 to 320 ms, more preferably from 150 to 280 ms, more preferably from 160 to 240 ms, most preferably from 180 to 220 ms.

An embodiment 5 of the method 1 according to the invention is constructed according to one of the preceding embodiments, wherein, in method step a), the folded planar composite is a container precursor, wherein, in method step d), the joining is a closing of the container precursor.

An embodiment 6 of the method 1 according to the invention is constructed according to embodiment 5, wherein, before method step c), a foodstuff is introduced into the container precursor.

An embodiment 7 of the method 1 according to the invention is constructed according to embodiment 5 or 6, wherein, in method step d), a closed container is obtained, wherein the closed container is autoclaved or pasteurised or both.

An embodiment 8 of the method 1 according to the invention is constructed according to one of the embodiments 5 to 7, wherein, before method step c), the container precursor is sterilised. A preferred sterilisation is effected by contacting with gaseous hydrogen peroxide or liquid hydrogen peroxide or both. A preferred contacting here is one selected from the group consisting of a dipping, a rinsing, and a spraying, or a combination of at least two thereof.

An embodiment 9 of the method 1 according to the invention is constructed according to one of the preceding embodiments, wherein, in method step a), the provision comprises
   i) a provision of a planar composite, comprising
      A) a layer sequence, comprising
         I) a composite carrier layer, and
         II) a composite barrier layer,
      B) an edge region, and
      C) an inner region, adjacent to the edge region;
   ii) decreasing a layer thickness of the composite carrier layer in the edge region;
   iii) producing a fold in the edge region thereby obtaining a first edge fold region and a further edge fold region, wherein the first edge fold region and the further edge fold region adjoin each other along the fold;

iv) contacting a surface of the first edge fold region with a surface of the further edge fold region;

v) producing a further fold in the inner region thereby obtaining a first composite fold region and a further composite fold region, wherein the further composite fold region comprises the edge region and a part of the inner region;

vi) joining the first composite fold region to the further edge fold region and the part of the inner region.

An embodiment 10 of the method 1 according to the invention is constructed according to the embodiment 9, wherein, in method step ii), the decreasing is a skiving of the composite carrier layer.

An embodiment 11 of the method 1 according to the invention is constructed according to the embodiment 10, wherein the skiving is effected by a rotating tool.

An embodiment 12 of the method 1 according to the invention is constructed according to one of the embodiments 9 to 11, wherein, in method step i), the planar composite comprises a crease, wherein, in method step v), the production of the further fold comprises a folding along the crease.

A contribution to achieving at least one of the objects according to the invention is made by an embodiment 1 of a closed container 1, obtainable by the method 1 according to one of its embodiments 1 to 12.

A contribution to achieving at least one of the objects according to the invention is made by an embodiment 1 of a closed container 2, surrounding an interior, wherein the closed container comprises a folded planar composite, wherein the folded planar composite comprises a first seam region and a further seam region, wherein the first seam region is joined to the further seam region along a seam, wherein the first seam region or the further seam region or both has a depression along the seam.

An embodiment 2 of the closed container 2 according to the invention is constructed according to its embodiment 1, wherein the further seam region comprises a first composite layer, wherein the first seam region comprises a second composite layer, a third composite layer, a fourth composite layer, a first composite region and a further composite region; wherein the seam is between the first composite layer and the second composite layer; wherein the first composite layer comprises a first carrier layer; wherein the second composite layer comprises a second carrier layer; wherein the third composite layer comprises a third carrier layer; wherein the fourth composite layer comprises a fourth carrier layer; wherein the first composite region comprises a first layer sequence, comprising as layers superimposing one another in the direction from the seam through the first layer sequence, the second composite layer, the third composite layer and the fourth composite layer; wherein, in the first composite region, the third composite layer is joined to the fourth composite layer; wherein, in the first composite region, the fourth carrier layer is characterised by a greater layer thickness than the second carrier layer or the third carrier layer or each of both; wherein the further composite region comprises a further layer sequence, comprising as layers superimposing one another in the direction from the seam through the further layer sequence, the second composite layer and the fourth composite layer; wherein, in the further composite region, the second composite layer is joined to the fourth composite layer; wherein, in the further composite region, the second carrier layer is characterised by a greater layer thickness than in the first composite region; wherein the further composite region is adjacent to the first composite region.

An embodiment 3 of the closed container 2 according to the invention is constructed according to its embodiment 1 or 2, wherein the folded planar composite surrounds the interior on all sides, wherein the folded planar composite is constructed in one piece.

An embodiment 4 of the closed container 2 according to the invention is constructed according to one of its embodiments 1 to 3, wherein a carrier layer of the folded planar composite comprises a hole, wherein the hole is covered at least with a barrier layer of the folded planar composite as a hole-covering layer. Preferably, the hole is further covered with an opening device, wherein the opening device is arranged for opening the closed container in a region of the hole.

A contribution to achieving at least one of the objects according to the invention is made by an embodiment 1 of a use 1 of the device 1 according to one of its embodiments 1 to 18 for joining the first composite layer to the second composite layer.

Preferred embodiments of constituents of the device according to the invention are likewise preferred as embodiments of constituents of the same name or corresponding constituents in the method according to the invention and in the closed container according to the invention. Furthermore, preferred embodiments of constituents used in the method according to the invention and constituents of the closed container according to the invention are similarly preferred for constituents of the same name or corresponding constituents of the device according to the invention.

Layers

Two layers are joined to one another if their adhesion to one another goes beyond van der Waals forces of attraction. Layers joined to one another are preferably one selected from the group consisting of sealed to one another, glued to one another and pressed to one another, or a combination of at least two of these. Unless stated otherwise, in a layer sequence the layers can follow one another indirectly, that is to say with one or at least two intermediate layers, or directly, that is to say without an intermediate layer. This is the case in particular in the wording where one layer superimposes another layer. A wording where a layer sequence comprises listed layers means that at least the stated layers are present in the stated sequence. This wording does not necessarily say that these layers follow one another directly. A wording where two layers are adjacent to one another says that these two layers follow one another directly and therefore without an intermediate layer. However, this wording says nothing about whether or not the two layers are joined to one another. Rather, these two layers can be in contact with one another.

Joining

A preferred joining is one selected from the group consisting of a sealing, a gluing and a pressing, or a combination of at least two of these. In the case of sealing, the join is created by means of a liquid and solidification thereof. In the case of gluing, chemical bonds which create the join form between the boundary faces or surfaces of the two objects to be joined. In the case of sealing or gluing, it is often advantageous for the surfaces to be sealed or glued to be pressed together with one another. A preferred pressing of two layers is pressing on to one another in each case of a first surface of the first of the two layers on to a second surface of the second of the two layers facing the first surface over at least 20%, preferably at least 30%, more preferably at least 40%, more preferably 50%, more preferably at least 60%, more preferably at least 70%, still more preferably at least 80%, still more preferably at least 90%, most preferably at least 95% of the first surface. A particularly preferred joining is a sealing. A preferred sealing comprises as steps a laying on one another, a heating and a pressing, wherein the steps are preferably carried out in this sequence. Another sequence is likewise conceivable, in particular the sequence of heating, laying on one another and pressing. A preferred heating is a heating of a polymer layer, preferably a thermoplastic layer, more preferably a polyethylene layer or a polypropylene layer or both. A further preferred heating is a heating of a polyethylene layer to a temperature in a range of from 80 to 140° C., more preferably from 90 to 130° C., most preferably from 100 to 120° C. A further preferred heating is a heating of a polypropylene layer to a temperature in a range of from 120 to 200° C., more preferably from 130 to 180° C., most preferably from 140 to 170° C. A further preferred heating is carried out to a sealing temperature of the polymer layer. A preferred heating can be carried out by radiation, by hot gas, by thermal contact with a solid, by mechanical vibrations, preferably by ultrasound, by convection or by a combination of at least two of these measures. A particularly preferred heating is carried out by excitation of an ultrasonic vibration.

Contacting

A preferred contacting is pressing on one another.

Top Layer

A preferred top layer is a "coat". A "coat" in papermaking is a top layer which comprises inorganic solid particles, preferably pigments and additives. The "coat" is preferably applied as a liquid phase, preferably as a suspension or dispersion, to a surface of a layer containing paper or cardboard. A preferred dispersion is an aqueous dispersion. A preferred suspension is an aqueous suspension. A further preferred liquid phase comprises inorganic solid particles, preferably pigments; a binder; and additives. A preferred pigment is selected from the group consisting of calcium carbonate, kaolin, talc, silicate, a plastics pigment and titanium dioxide. A preferred kaolin is a calcined kaolin. A preferred calcium carbonate is one selected from the group consisting of marble, chalk and a precipitated calcium carbonate (PCC) or a combination of at least two of these. A preferred silicate is a laminar silicate. A preferred plastics pigment is in bead form, preferably hollow bead form. A preferred binder is one selected from the group consisting of styrene/butadiene, acrylate, acrylonitrile, a starch and a polyvinyl alcohol or a combination of at least two of these, acrylate being preferred. A preferred starch is one selected from the group consisting of cationically modified, anionically modified and fragmented or a combination of at least two of these. A preferred additive is one selected from the group consisting of a rheology modifier, a nuancing dyestuff, an optical brightener, a carrier for an optical brightener, a flocculating agent, a deaerating agent and a surface energy modifier or a combination of at least two of these. A preferred deaerating agent is a brush paint deaerating agent, preferably based on silicon or based on fatty acids or both. A preferred surface energy modifier is a surfactant.

Carrier Layer

As the carrier layer, any material which is suitable for this purpose to the person skilled in the art and which has an adequate strength and rigidity to give the container according to the invention or a container made of the planar composite according to the invention stability to the extent that in the filled state the container substantially retains its shape can be employed. In addition to a number of plastics, plant-based fibrous substances, in particular celluloses, preferably sized, bleached and/or non-bleached celluloses, are preferred, paper and cardboard being particularly preferred. The weight per unit area of a carrier layer, preferably each carrier layer, is preferably in a range of from 120 to 450 $g/m^2$, particularly preferably in a range of from 130 to 400 $g/m^2$ and most preferably in a range of from 150 to 380 $g/m^2$. A preferred cardboard as a rule has a single- or multilayered structure and can be coated on one or both sides with one or also more top layers. A preferred cardboard furthermore has a residual moisture content of less than 20 wt. %, preferably from 2 to 15 wt. % and particularly preferably from 4 to 10 wt. %, based on the total weight of the cardboard. A particularly preferred cardboard has a multilayered structure. The cardboard furthermore preferably has at least one, but particularly preferably at least two layers of a top layer, which is known to the person skilled in the art as "coat", on the surface facing the environment. A preferred cardboard furthermore preferably has a Scott bond value in a range of from 100 to 360 $J/m^2$, preferably from 120 to 350 $J/m^2$ and particularly preferably from 135 to 310 $J/m^2$. By the above-mentioned ranges, it is possible to provide a composite from which a container of high leakproofness can be folded easily and in low tolerances. A preferred carrier layer comprises on at least one surface, preferably on two opposite surfaces, in each case a top layer. Preferably, each carrier layer comprises on each surface, if this is not expressly ruled out, a top layer. Most preferably, each carrier layer comprises no top layer only on one skived surface optionally present. Preferably, the first carrier layer and the second carrier layer are constructed in one piece. More preferably, the first carrier layer and the second carrier layer and the third carrier layer are constructed in one piece. Still more preferably, the first carrier layer and the second carrier layer and the third carrier layer and the fourth carrier layer are constructed in one piece. Most preferably, all the carrier layers are constructed in one piece.

Barrier Layer

As the barrier layer, any material which is suitable for this purpose to the person skilled in the art and has an adequate barrier action, in particular against oxygen, can be employed. The barrier layer is preferably selected from a. a barrier layer of plastic;

b. a metal layer;

c. a metal oxide layer; or d. a combination of at least two of a. to c.

If the barrier layer according to alternative a. is a barrier layer of plastic, this preferably comprises at least 70 wt. %, particularly preferably at least 80 wt. % and most preferably at least 95 wt. % of at least one plastic which is known to the person skilled in the art for this purpose, in particular because of aroma or gas barrier properties which are suitable for packaging containers. Possible plastics, in particular thermoplastics, here are N- or O-carrying plastics, both by themselves and in mixtures of two or more. According to the invention, it may prove advantageous if the barrier layer of plastic has a melting temperature in a range of from more than 155 to 300° C., preferably in a range of from 160 to 280° C. and particularly preferably in a range of from 170 to 270° C.

Further preferably, the barrier layer of plastic has a weight per unit area in a range of from 2 to 120 $g/m^2$, preferably in a range of from 3 to 60 $g/m^2$, particularly preferably in a range of from 4 to 40 $g/m^2$ and moreover preferably from 6 to 30 $g/m^2$. Furthermore preferably, the barrier layer of plastic is obtainable from melts, for example by extrusion, in particular laminating extrusion. Moreover preferably, the barrier layer of plastic can also be introduced into the planar composite via lamination. It is preferable here for a film to be incorporated into the planar composite. According to another embodiment barrier layers of plastic which are obtainable by deposition from a solution or dispersion of plastics can also be selected.

Possible suitable polymers are preferably those which have a weight-average molecular weight, determined by gel permeation chromatography (GPC) by means of light scattering, in a range of from $3 \cdot 10^3$ to $1 \cdot 10^7$ g/mol, preferably in a range of from $5 \cdot 10^3$ to $1 \cdot 10^6$ g/mol and particularly preferably in a range of from $6 \cdot 10^3$ to $1 \cdot 10^5$ g/mol. Possible suitable polymers are, in particular, polyamide (PA) or polyethylenevinyl alcohol (EVOH) or a mixture thereof.

Among the polyamides, all PA which seem suitable for the use according to the invention to the person skilled in the art are possible. PA 6, PA 6.6, PA 6.10, PA 6.12, PA 11 or PA 12 or a mixture of at least two of these are to be mentioned here in particular, PA 6 and PA 6.6 being particularly preferred and PA 6 being further preferred. PA 6 is commercially obtainable, for example, under the trade names Akulon®, Durethan® and Ultramid®. Amorphous polyamides, such as e.g. MXD6, Grivory® and Selar® PA, are moreover suitable. It is further preferable for the PA to have a density in a range of from 1.01 to 1.40 g/cm³, preferably in a range of from 1.05 to 1.30 g/cm³ and particularly preferably in a range of from 1.08 to 1.25 g/cm³. Furthermore, it is preferable for the PA to have an viscosity number in a range of from 130 to 185 ml/g and preferably in a range of from 140 to 180 ml/g.

As EVOH, all EVOH which seem suitable for the use according to the invention to the person skilled in the art are possible. Examples of these are, inter alia, commercially obtainable in a large number of different configurations under the trade name EVAL™ from EVAL Europe NV, Belgium, for example the types EVAL™ F104B or EVAL™ LR171B. Preferred EVOH have at least one, two, several or all of the following properties:

- an ethylene content in a range of from 20 to 60 mol %, preferably from 25 to 45 mol %;
- a density in a range of from 1.0 to 1.4 g/cm³, preferably from 1.1 to 1.3 g/cm³;
- a melting point in a range of from more than 155 to 235° C., preferably from 165 to 225° C.;
- an MFR value (210° C./2.16 kg if $T_{M(EVOH)}$<230° C.; 230° C./2.16 kg if 210° C.<$T_{M(EVOH)}$<230° C.) in a range of from 1 to 25 g/10 min, preferably from 2 to 20 g/10 min;
- an oxygen permeation rate in a range of from 0.05 to 3.2 cm³·20 μm/m²·day·atm, preferably in a range of from 0.1 to 1 cm³·20 μm/m²·day·atm.

According to alternative b. the barrier layer is a metal layer. All layers with metals which are known to the person skilled in the art and can create a high impermeability to light and oxygen are suitable in principle as the metal layer. According to a preferred embodiment the metal layer can be present as a foil or as a deposited layer, e.g. formed by a physical gas phase deposition. The metal layer is preferably an uninterrupted layer. According to a further preferred embodiment the metal layer has a thickness in a range of from 3 to 20 μm, preferably a range of from 3.5 to 12 μm and particularly preferably in a range of from 4 to 10 μm.

Metals which are preferably selected are aluminium, iron or copper. A steel layer, e.g. in the form of a foil, may be preferred as an iron layer. Furthermore preferably, the metal layer is a layer with aluminium. The aluminium layer can expediently be made of an aluminium alloy, for example AlFeMn, AlFe1.5Mn, AlFeSi or AlFeSiMn. The purity is conventionally 97.5% and higher, preferably 98.5% and higher, in each case based on the total aluminium layer. In a particular embodiment the metal layer is made of an aluminium foil. Suitable aluminium foils have an ductility of more than 1%, preferably of more than 1.3% and particularly preferably of more than 1.5%, and a tensile strength of more than 30 N/mm², preferably more than 40 N/mm² and particularly preferably more than 50 N/mm². Suitable aluminium foils show a drop size of more than 3 mm, preferably more than 4 mm and particularly preferably of more than 5 mm in the pipette test. Suitable alloys for establishing aluminium layers or foils are commercially obtainable under the designations EN AW 1200, EN AW 8079 or EN AW 8111 from Hydro Aluminium Deutschland GmbH or Amcor Flexibles Singen GmbH.

In the case of a metal foil as the barrier layer, an adhesion promoter layer can be provided between the metal foil and a next polymer layer on one and/or both sides of the metal foil. According to a particular embodiment of the container according to the invention, however, on no side of the metal foil there is provided an adhesion promoter layer between the metal foil and the next polymer layer.

Furthermore preferably, a metal oxide layer can be selected as the barrier layer according to alternative c. Possible metal oxide layers are all metal oxide layers which are familiar and seem suitable to the person skilled in the art for achieving a barrier action against light, vapour and/or gas. Metal oxide layers based on the metals aluminium, iron or copper already mentioned above and those metal oxide layers based on titanium or silicon oxide compounds are preferred in particular. A metal oxide layer is produced, by way of example, by vapour deposition of a metal oxide on a layer of plastic, for example an orientated polypropylene film. A preferred process for this is physical gas phase deposition.

According to a further preferred embodiment the metal layer or metal oxide layer can be present as a laminated composite of one or more layers of plastic with a metal layer. Such a layer is obtainable, for example, by vapour deposition of a metal on a layer of plastic, for example an orientated polypropylene film. A preferred process for this is physical gas phase deposition.

Preferably, the first barrier layer and the second barrier layer are constructed in one piece. More preferably, the first barrier layer and the second barrier layer and the third barrier layer are constructed in one piece. Still more preferably, the first barrier layer and the second barrier layer and the third barrier layer and the fourth barrier layer are constructed in one piece. Most preferably, all the barrier layers are constructed in one piece.

Polymer Layers

Preferably, in each case a polymer layer is located between the first carrier layer and the first barrier layer, likewise preferably between the second carrier layer and the second barrier layer, likewise preferably the third carrier layer and the third barrier layer, likewise preferably the fourth carrier layer and the fourth barrier layer. Furthermore preferably, the first barrier layer is superimposed by a polymer layer, preferably joined to the polymer layer, on one side facing away from the first carrier layer. Furthermore preferably, the second barrier layer is superimposed by a polymer layer, preferably joined to the polymer layer, on one side facing away from the second carrier layer. Furthermore preferably, the third barrier layer is superimposed by a polymer layer, preferably joined to the polymer layer, on one side facing away from the third carrier layer. Furthermore preferably, the fourth barrier layer is superimposed by a polymer layer, preferably joined to the polymer layer, on one side facing away from the fourth carrier layer. Further preferably, the first carrier layer is superimposed by a polymer layer, preferably joined to the polymer layer, on one side facing away from the first barrier layer. Further preferably, the second carrier layer is superimposed by a polymer layer, preferably joined to the polymer layer, on one side facing away from the second barrier layer, wherein the second carrier layer is preferably not joined to the polymer layer and not superimposed by the polymer layer in the second composite region on the side facing away from the second barrier layer. Further preferably, the third carrier layer is superimposed by a polymer layer, preferably joined to the polymer layer, on one side facing away from the third barrier layer, wherein the third carrier layer is preferably not joined to the polymer layer and not superimposed by the polymer layer in the first composite region, the second composite region and the third composite region on the side facing away from the third barrier layer. Further preferably, the fourth carrier layer is superimposed by a polymer layer, preferably joined to the polymer layer, on one side facing away from the fourth barrier layer.

Each polymer layer can have further constituents. These polymer layers are preferably incorporated into or applied to the layer sequence in an extrusion process. The further constituents of the polymer layers are preferably constituents which do not adversely influence the properties of the polymer melt during application as a layer. The further constituents can be, for example, inorganic compounds, such as metal salts, or further plastics, such as further thermoplastics. However, it is also conceivable for the further constituents to be fillers or pigments, for example carbon black or metal oxides. Possible suitable thermoplastics for the further constituents are in particular those which can be easily processed due to good extrusion properties. Among these, polymers obtained by chain polymerization are suitable, in particular polyesters or polyolefins, where cyclic olefin copolymers (COC), polycyclic olefin copolymers (POC), in particular polyethylene and polypropylene, are particularly preferred and polyethylene is very particularly preferred. Among the polyethylenes, HDPE, MDPE, LDPE, LLDPE, VLDPE and PE and mixtures of at least two of these are preferred. Mixtures of at least two thermoplastics can also be employed. Suitable polymer layers have a melt flow rate (MFR) in a range of from 1 to 25 g/10 min, preferably in a range of from 2 to 20 g/10 min and particularly preferably in a range of from 2.5 to 15 g/10 min, and a density in a range of from 0.890 g/cm$^3$ to 0.980 g/cm$^3$, preferably in a range of from 0.895 g/cm$^3$ to 0.975 g/cm$^3$, and further preferably in a range of from 0.900 g/cm$^3$ to 0.970 g/cm$^3$. The polymer layers preferably have at least one melting temperature in a range of from 80 to 155° C., preferably in a range of from 90 to 145° C. and particularly preferably in a range of from 95 to 135° C. A preferred polymer layer is a polyolefin layer, preferably a polyethylene layer or a polypropylene layer or both.

Polyolefin

A preferred polyolefin is a polyethylene or a polypropylene or both. A preferred polyethylene is one selected from the group consisting of an LDPE, an LLDPE and an HDPE or a combination of at least two of these. A preferred polyolefin is an m-polyolefin. Suitable polyethylenes have a melt flow rate (MFR) in a range of from 1 to 25 g/10 min, preferably in a range of from 2 to 20 g/10 min and particularly preferably in a range of from 2.5 to 15 g/10 min, and a density in a range of from 0.910 g/cm$^3$ to 0.935 g/cm$^3$, preferably in a range of from 0.912 g/cm$^3$ to 0.932 g/cm$^3$, and further preferably in a range of from 0.915 g/cm$^3$ to 0.930 g/cm$^3$.

m-Polyolefin

An m-polyolefin is a polyolefin which has been produced by means of a metallocene catalyst. A metallocene is an organometallic compound in which a central metal atom is arranged between two organic ligands, such as, for example, cyclopentadienyl ligands. A preferred m-polyolefin is an m-polyethylene or an m-polypropylene or both. A preferred m-polyethylene is one selected from the group consisting of an mLDPE, an mLLDPE and an mHDPE or a combination of at least two of these.

Melting Temperatures

A preferred m-polyolefin is characterised by at least a first melting temperature and a second melting temperature. Preferably, the m-polyolefin is characterised by a third melting temperature in addition to the first and the second melting temperature. A preferred first melting temperature is in a range of from 84 to 108° C., preferably from 89 to 103° C., more preferably from 94 to 98° C. A preferred further melting temperature is in a range of from 100 to 124° C., preferably from 105 to 119° C., more preferably from 110 to 114° C.

Adhesion/Adhesion Promoter Layer

An adhesion promoter layer can be located between layers of the planar composite which are not directly adjacent to one another. In particular, in each case an adhesion promoter layer can be located between each n-th barrier layer and a polymer layer which superimposes the n-th barrier layer on one side facing away from the nth carrier layer, wherein n is an integer from the range of from 1 to 4.

Possible adhesion promoters in an adhesion promoter layer are all plastics which, due to functionalization by means of suitable functional groups, are suitable for producing a firm join by the formation of ionic bonds or covalent bonds to a surface of a particular adjacent layer. Preferably, these are functionalized polyolefins which have been obtained by copolymerization of ethylene with acrylic acids, such as acrylic acid, methacrylic acid, crotonic acid, acrylates, acrylate derivatives or carboxylic acid anhydrides carrying double bonds, for example maleic anhydride, or at least two of these. Among these, polyethylene-maleic anhydride graft polymers (EMAH), ethylene-acrylic acid copolymers (EAA) or ethylene-methacrylic acid copolymers (EMAA), which are marketed, for example, under the trade names Bynel® and Nucrel® 0609HSA by DuPont or Escor® 6000ExCo by ExxonMobil Chemicals, are preferred.

According to the invention it is preferable for the adhesion between a carrier layer, a polymer layer or a barrier layer and the particular next layer to be at least 0.5 N/15 mm, preferably at least 0.7 N/15 mm and particularly preferably at least 0.8 N/15 mm. In one embodiment according to the invention it is preferable for the adhesion between a polymer layer and a carrier layer to be at least 0.3 N/15 mm, preferably at least 0.5 N/15 mm and particularly preferably at least 0.7 N/15 mm. It is furthermore preferable for the adhesion between a barrier layer and a polymer layer to be at least 0.8 N/15 mm, preferably at least 1.0 N/15 mm and particularly preferably at least 1.4 N/15 mm. In the case where a barrier layer indirectly follows a polymer layer via an adhesion promoter layer, it is preferable for the adhesion between the barrier layer and the adhesion promoter layer to be at least 1.8 N/15 mm, preferably at least 2.2 N/15 mm and particularly preferably at least 2.8 N/15 mm. In a particular embodiment the adhesion between the individual layers is so strong in construction that in the adhesion test tearing of a carrier layer, and in the case of a cardboard as the carrier layer a so-called tearing of the cardboard fibre, occurs.

In One Piece

Two layers are constructed in one piece if there is a transition region in which the two layers are adjacent to one another and pass into one another without an intermediate layer and without a joining element. A preferred transition region is a fold region. A fold region comprises a fold. A preferred fold runs along a crease. Layers constructed in one piece have preferably been produced together as one piece from raw materials and have not been joined to one another after this production. Layers constructed in one piece preferably have the same composition or the same build-up or both. In one embodiment of the invention it is preferable for at least one layer, preferably all the layers, of the composite in each case to be constructed as such in one piece. It is equally preferable for layers of the same name of different composite regions to be constructed in each case as such in one piece via at least two of these different composite regions.

Container Precursor

A preferred container precursor is in the form of a jacket or tubular or both. A container precursor in the form of a jacket is preferably characterised in that its outer surface corresponds to a geometric jacket surface. A tubular container precursor is preferably a semi-continuous tube structure having in each case an opening at opposite ends of the tube.

Container

The closed container according to the invention can have a large number of different forms, but a substantially parallelepipedal structure is preferred. The container can furthermore be formed over its complete surface from a planar composite, or can have a 2- or multi-part structure. In the case of a multi-part structure, it is conceivable that in addition to the planar composite, other materials can also be employed, for example plastic material, which can be employed in particular in the head or base regions of the container. However, it is preferable here for the container to be built up from the planar composite to the extent of at least 50%, particularly preferably to the extent of at least 70% and moreover preferably to the extent of at least 90% of the surface. Furthermore, the container can have a device for emptying the contents. This can be formed, for example, from plastic material and attached to the outside of the container. It is also conceivable that this device is integrated into the container by direct injection moulding. According to a preferred embodiment the container according to the invention has at least one, preferably from 4 to 22 or also more edges, particularly preferably from 7 to 12 edges. In the context of the present invention, edge is understood as meaning regions which are formed on folding a surface. Edges which may be mentioned by way of example are the longitudinal contact regions of in each case two wall surfaces of the container. In the container, the container walls preferably represent the surfaces of the container framed by the edges. Preferably, the closed container comprises no base which is not constructed in one piece with the planar composite or no lid which is not constructed in one piece with the planar composite or both.

Skiving

Skiving is a method step known to the person skilled in the art for reducing a layer thickness of a layer, preferably a carrier layer, more preferably a carrier layer of one selected from the groups consisting of cardboard, pasteboard and paper or a combination of at least two of these. The skiving is preferably carried out with a material-removing tool, preferably with a skiving tool or a splitting tool or both. A preferred material-removing tool is a rotating tool. A most preferred rotating tool is a blade, preferably a cup blade, or a milling tool or both. A further preferred material-removing tool is a blade, preferably a rotating blade, most preferably a cup blade, or a milling tool or both.

Folding the Planar Composite

It is preferable for the folding to be carried out in a temperature range of from 10 to 50° C., preferably in a range of from 15 to 45° C. and particularly preferably in a range of from 20 to 40° C. of the folded region of the planar composite. This can be achieved by the planar composite having a temperature in the above ranges. It is furthermore preferable for a folding tool, preferably together with the planar composite, to have a temperature in the above range. For this, the folding tool has no heating. Rather, the folding tool or also the planar composite or both can be cooled. It is furthermore preferable for the folding to be carried out at a temperature of at most 50° C. as "cold folding" and for the joining to be carried out at above 50° C., preferably above 80° C. and particularly preferably above 120° C. as "heat sealing". The above conditions and in particular temperatures preferably also apply in the folding environment, for example in the housing of the folding tool. It is further preferable for the cold folding or the cold folding in combination with the heat sealing to be applied at angles μ which form during folding of less than 100°, preferably less than 90°, particularly preferably less than 70° and moreover preferably less than 50°. The angle μ is formed by two adjacent fold surfaces.

According to the invention, in this context "folding" is understood as meaning an operation in which preferably a longitudinal kink forming an angle is produced in the folded planar composite by means of a folding edge of a folding tool. For this, two adjacent surfaces of a planar composite are often bent ever more towards one another. By the folding, at least two adjacent fold surfaces are formed, which can then be joined at least in part regions to form a container region. According to the invention the joining can be carried out by any measure which appears to be suitable to the person skilled in the art and which renders possible a join which is as gas- and liquid-tight as possible.

It is further preferable for the fold surfaces to form an angle μ of less than 90°, preferably of less than 45° and particularly preferably of less than 20°. The fold surfaces are often folded to the extent that these come to lie on one another at the end of the folding. This is advantageous in particular if the fold surfaces lying on one another are subsequently joined to one another in order to form the container base and the container head, which is often configured gable-like or also flat. Regarding the gable configuration, reference may be made by way of example to WO 90/09926 A2.

Longitudinal Seam

Preferably, the first composite region and the further composite region belong to a longitudinal seam of a container precursor or of the closed container. Preferably, the first composite region and the further composite region form a longitudinal seam of a container precursor or of the closed container. Preferably, the device according to the invention is constructed such that a container precursor can be closed by sealing, sealing being carried out via the longitudinal seam of the container precursor, preferably transversely. During the sealing a thickened side of the longitudinal seam is, according to the invention, not in the recess, but precisely adjacent to the other fixing surface opposite the recess.

Foodstuffs

Possible foodstuffs are all the foodstuffs for human consumption and also animal feeds known to the person skilled in the art. Preferred foodstuffs are liquid above 5° C., for example dairy products, soups, sauces and non-carbonated drinks. The filling of the container or the container precursor can be carried out in various ways. On the one hand, the foodstuff and the container or the container precursor can be sterilized separately, before the filling, to the greatest degree possible by suitable measures, such as treatment of the container or the container precursor with $H_2O_2$, UV radiation or other suitable high-energy radiation, plasma treatment or a combination of at least two of these, as well as heating of the foodstuff, and the container or the container precursor is then filled. This type of filling is often called "aseptic filling" and is preferred according to the invention. In addition to or also instead of the aseptic filling, it is furthermore a widespread procedure to heat the container or the container precursor, which has been filled with foodstuff and closed, to reduce the germ count. This is preferably carried out by pasteurization or autoclaving. Less sterile foodstuffs and containers or container precursors can also be employed in this procedure.

Hole/Opening Aid

In order to facilitate the ease of opening of the closed container according to the invention, a carrier layer can have at least one hole. In a particular embodiment the hole is covered at least with a barrier layer and preferably a polymer layer, as hole-covering layers. Furthermore, one or more further layers, in particular adhesion promoter layers, can be provided between the layers already mentioned. It is preferable here for the hole-covering layers to be joined to one another at least partially, preferably to the extent of at least 30%, preferably at least 70% and particularly preferably to the extent of at least 90% of the area formed by the hole. According to a particular embodiment it is preferable for the hole to penetrate through the entire planar composite and to be covered by a closure or opening device which closes the hole. In connection with a preferred embodiment the hole provided in the carrier layer can have any form which is known to the person skilled in the art and is suitable for various closures, drinking straws or opening aids. The opening of a closed container is usually carried out by at least partial destruction of the hole-covering layers covering the hole. This destruction can be effected by cutting, pressing into the container or pulling out of the container. The destruction can be effected by an openable closure joined to the container and arranged in the region of the hole, usually above the hole, or a drinking straw which is pushed through the hole-covering layers covering the hole.

According to a further preferred embodiment a carrier layer of the planar composite has a plurality of holes in the form of a perforation, wherein the individual holes are covered at least with a barrier layer, and preferably a polymer layer, as hole-covering layers. A container produced from such a composite can then be opened by tearing along the perforation. Such holes for perforations are preferably produced by means of a laser. The use of laser beams is particularly preferred if a metal foil or a metallized film is employed as the barrier layer. It is furthermore possible for the perforation to be introduced by mechanical perforation tools, usually having blades.

According to a further preferred embodiment the planar composite is subjected to a heat treatment at least in the region of the at least one hole. In the case of several holes present in the carrier layer in the form of a perforation it is particularly preferable for this heat treatment also to be carried out around the edge region of the hole. The heat treatment can be carried out by radiation, by hot gas, by thermal contact with a solid, by mechanical vibrations, preferably by ultrasound, or by a combination of at least two of these measures. Particularly preferably, the heat treatment is carried out by irradiation, preferably electromagnetic radiation and particularly preferably electromagnetic induction or also by hot gas. The particular optimum operating parameters to be chosen are known to the person skilled in the art.

Irradiation

In the case of irradiation, any type of radiation which is suitable to the person skilled in the art for softening the polymer layers present is possible. Preferred types of radiation are IR rays, UV rays and microwaves. In the case of IR rays, which are also employed for IR welding of planar composites, wavelength ranges of from 0.7 to 5 μm are to be mentioned. Furthermore, laser beams can be employed in a wavelength range of from 0.6 to less than 1.6 In connection with the use of IR rays, these are generated by various suitable radiation emitters which are known to the person skilled in the art. Short wavelength radiation emitters in the range of from 1 to 1.6 μm are preferably halogen radiation emitters. Medium wavelength radiation emitters in the range of from >1.6 to 3.5 μm are, for example, metal foil radiation emitters. Quartz radiation emitters are often employed as long wavelength radiation emitters in the range of >3.5 Lasers are ever more often employed. Thus, diode lasers are employed in a wavelength range of from 0.8 to 1 Nd:YAG lasers at about 1 μm and $CO_2$ lasers at about 10.6 High frequency techniques with a frequency range of from 10 to 45 MHz, often in a power range of from 0.1 to 100 kW, are also employed.

Ultrasound

In the case of ultrasound, the following treatment parameters are preferred:

P1 a frequency in a range of from 5 to 100 kHz, preferably in a range of from 10 to 50 kHz and particularly preferably in a range of from 15 to 40 kHz;

P2 an amplitude in the range of from 2 to 100 preferably in a range of from 5 to 70 μm and particularly preferably in a range of from 10 to 50 μm;

P3 a vibration time (as the period of time in which a vibrating body, such as a sonotrode or inductor, acts in contact vibration on the planar composite) in a range of from 50 to 1,000 ms, preferably in a range of from 100 to 600 ms and particularly preferably in a range of from 150 to 300 ms.

For a suitable choice of the radiation or vibration conditions, it is advantageous to take into account the intrinsic resonances of the plastics and to select frequencies close to these.

Contact with a Solid

Heating via contact with a solid can be effected, for example, by a heating plate or heating mould which is in direct contact with the planar composite and releases the heat to the planar composite.

Hot Gas

The hot gas, preferably hot air, can be directed on to the planar composite by suitable fans, outlets or nozzles or a combination thereof. Contact heating and hot gas are often employed simultaneously. Thus, for example, a holding device for a tube formed from the planar composite and through which hot gas flows, and which is thereby heated up and releases the hot gas through suitable openings, can heat the planar composite by contact with the wall of the holding device and the hot gas. Furthermore, the tube can also be heated by fixing the tube with a tube holder and directing a flow from one or two and more hot gas nozzles provided in the jacket holder on to the regions of the tube which are to be heated.

Fixing Element

The first fixing element and the further fixing element are constructed such that the planar composite can be fixed, preferably clamped, at least partially between the first fixing surface and the further fixing surface. For this the first fixing element or the further fixing element or both can be prism-shaped, where the prism can have a rectangular or trapezoidal base area. In the case of the prism-shaped fixing element, the corresponding fixing surface is preferably a side surface of the prism, which represents a part of a generated surface of the prism. Furthermore, the first fixing element or the further fixing element or both can be constructed as a circular tube. In the case of a circular tube as the fixing element the corresponding fixing surface is a part of the generated surface of the circular tube. Preferably, at least one of the two fixing surfaces, preferably the first fixing surface, is flat in construction. Preferably, at least one of the two fixing surfaces, preferably the further fixing surface, is flat in construction outside the recess. The first fixing element is preferably knife-like or blade-like or both in construction. The knife edge here comprises precisely the first fixing surface. In this context the cutting edge is not knife-sharp, but blunt in construction. The first fixing element should be able to press or squeeze the planar composite by exerting pressure, but not cut it. The terms knife-like and blade-like rather are intended to indicate the flat form of the fixing element. Preferably, the fixing elements extend longitudinally to the extent that several planar composites according to the invention can be fixed according to the invention side by side between the fixing elements. For this, at least one of the fixing elements has several, preferably identical recesses according to the invention. Preferably, the fixing element comprising the recesses is constructed as a bar.

Preferably, the recess is a groove. A preferred groove is a recess which extends longitudinally, preferably produced by milling. Preferably, the recess comprises two edges of the fixing element. Preferably, the region is constructed such that during pressing of the first composite region and of the further composite region between the first fixing surface and the further fixing surface no damage occurs, preferably no squeezing, to the first composite region or to the further composite region. Damage here can be, in particular, burning due to introduction of too much heat.

Preferably, the first fixing element or the further fixing element, more preferably the first fixing element, is constructed as a vibrating body, preferably a sonotrode, in order to vibrate at a high frequency, preferably in the ultrasonic range, and to excite a vibration in the planar composite. By excitation of vibration the heating of the planar composite necessary for sealing preferably takes place. Preferably only the layers of the planar composite are heated here to a temperature above their particular melting temperature, which is intended to contribute towards creating a sealing join of previously non-joined layers. Preferably, the first fixing element or the further fixing element, more preferably the further fixing element, is an anvil to the sonotrode. Preferably, the sonotrode does not comprise a recess.

A circumference of a fixing element is a circumference perpendicular to a direction along which the fixing element extends longitudinally. In the case of a prism-shaped fixing element the circumference of the fixing element is precisely the circumference of a base area of the prism. In the case of a circular tube as the fixing element the circumference of the fixing element is precisely the circumference of the circular tube.

Seam

A seam is a spatial region in which at least two seam regions are joined to one another. A seam region here is a partial region of a surface or a layer or both extending along the seam. The seam region is thus adjacent to the seam. If two layers or layer sequences are joined to one another along the seam, a partial region of the one layer or layer sequence along the seam is the first seam region and a partial region of the other layer or layer sequence along the seam is the further seam region. A preferred seam is a sealing seam. In the case of a sealing seam, the seam is the spatial region in which the sealing material was melted and now joins the two surfaces or layers or both to one another. A preferred seam is gas- and liquid-tight. A preferred seam is a head seam. A head seam is a seam of the closed container which closes the container in its head or gable region.

Sterilising

Sterilising designates a treatment of a product, preferably a container or a foodstuff or both, for reducing a germ count on or in the product. Sterilising can be carried out, for example, by the action of heat or by contact with a chemical. The chemical in this context can be gaseous or liquid or both. A preferred chemical is hydrogen peroxide.

Autoclaving

Autoclaving designates a treatment of a product, usually a filled and closed container, wherein the product is located in a pressure chamber and is heated to a temperature above 100° C., preferably between 100 and 140° C. Furthermore, the chamber pressure in the pressure chamber is above 1 bar, preferably above 1.1 bar, more preferably above 1.2 bar, more preferably above 1.3 bar and up to 4 bar. Further preferably, the autoclaving is carried out under contact of the product with water vapour.

Pasteurising

Pasteurising or pasteurisation designates brief heating of liquid or paste-like foodstuffs to temperatures up to 100° C. to kill microorganisms. It serves to keep, inter alia, milk, fruit and vegetable juices and liquid ice storable.

Measurement Methods

The following measurement methods were used in the context of the invention. Unless stated otherwise, the measurements were carried out at an ambient temperature of 25° C., an ambient air pressure of 100 kPa (0.986 atm) and a relative atmospheric humidity of 50%.

MFR Value

The MFR value is measured in accordance with the standard ISO 1133 (unless stated otherwise at 190° C. and 2.16 kg).

Density

The density is measured in accordance with the standard ISO 1183-1.

Melting Temperature

The melting temperature is determined with the aid of the DSC method ISO 11357-1, -5. The equipment is calibrated according to the manufacturer's instructions with the aid of the following measurements:

Temperature indium—onset temperature,
Heat of melting indium,
Temperature zinc—onset temperature.

Oxygen Permeation Rate

The oxygen permeation rate is determined in accordance with the standard ISO 14663-2 annex C at 20° C. and 65% relative atmospheric humidity.

Moisture Content of the Cardboard

The moisture content of the cardboard is measured in accordance with the standard ISO 287:2009.

Adhesion

For determination of the adhesion of two adjacent layers, these are fixed on a rotatable roll on a 90° peel test apparatus, for example German rotating wheel fixture from Instron, which rotates at 40 mm/min during the measurement. The samples were cut into 15 mm wide strips beforehand. On one side of the sample the layers are detached from one another and the detached end is clamped into a tensioning device directed perpendicularly upwards. A measuring apparatus for determining the tensile force is attached to the tensioning device. On rotation of the roll, the force necessary to separate the layers from one another is measured. This force corresponds to the adhesion of the layers to one another and is stated in N/15 mm. The separation of the individual layers can be carried out, for example, mechanically, or by a targeted pretreatment, for example by softening the sample for 3 min in 60° C. hot 30% strength acetic acid.

Layer Thickness

A sample approx. 2.5 to 3.0 cm×1.0 to 1.5 cm in size is removed from the composite material to be investigated. The long side of the sample should be transverse to the running direction of the extrusion and the fibre direction of the cardboard. The sample is fixed in a metal clamp which forms a smooth surface. The projection of the sample should be not more than 2 to 3 mm. The metal clamp is fixed before cutting. In order to obtain a clean cut, in particular of the cardboard fibres, the part of the sample projecting out of the metal clamp is frozen with refrigerating spray. This part is then removed by means of a disposable blade (Leica, Microtome Blades). The fixing of the sample in the metal clamp is now loosened such that the sample can be pushed approx. 3 to 4 mm out of the metal clamp. It is then fixed again. For the investigation under an optical microscope (Nicon Eclipse E800), the sample in the sample holder is placed on the object table of the optical microscope under one of the object lenses (magnification×2.5; ×5; ×10; ×20; ×50). The appropriate object lens should be selected according to the layer thickness of the region to be investigated. The precise centring is achieved under the microscope. In most cases illumination from the side (swan-neck lamps) serves as the light source. If necessary the reflected light illumination of the optical microscope is used in addition or as a substitute. Under optimum focusing and illumination of the sample, the individual layers of the composite should be detectable. An Olympus camera (Olympus DP 71) with appropriate image processing software (analySIS) from Analysis is used for documentation and measurements. The layer thickness of the individual layers is also determined with this.

Molecular Weight Distribution

The molecular weight distribution is measured by gel permeation chromatography by means of light scattering: ISO 16014-3/-5.

Viscosity Number of PA:

The viscosity number of PA is measured in accordance with the standard ISO 307 in 95% sulphuric acid.

Leakproofness

Test agent for the leakproofness testing: One litre of Shellsol D60 from Shell Chemicals with a Messerspitze Fettblau B01 (CAS No. 7354-14-2; C.I.Solvent Blue 35 Anthrachinone Dye). For this test, 500 containers are produced by the method 400 according to the invention and filled with water after method step b) 402 and before method step c) 403. The closed containers are then cut along the circumference of the container such that a sealed head region 112 according to FIG. 1A is obtained. This is filled with approx. 20 ml of the test agent and stored for 3 hours. On the outside of the head region it is then tested whether the test agent has produced blue discolorations there in the event of leaking of the sealing.

Weld Seam Discolouration

For this test, containers are produced according to the method 400 according to the invention and are filled with water after method step b) 402 and before method step c) 403. The closed containers are then cut along the circumference of the container in such a way that a sealed head region 112 according to FIG. 1A is obtained. Then, the head region is pressed flat and the head seam 701 is slowly split over the entire length of the packaging seal from the inside out. The composite regions 107 and 108 are inspected for discolourations. Here, in particular clearly recognisable dot-shaped brown discolourations are to be rated negatively.

The invention is described in more detail in the following by examples and drawings, where the examples and drawings do not mean a limitation of the invention.

For the examples summarised in table 1, container precursors were produced according to FIG. 1. The composite regions 107 and 108 comprise the layer sequences as shown in FIG. 2. Information on the sealing method for closing the head region and thereby producing the head seam, as well as the arrangement employed for this are shown in table 1. The arrangement of the fixing elements does not correspond to FIG. 2 for all examples and comparative examples. Rather, this arrangement is given in table 1. Furthermore, the fixing elements are not in all cases a sonotrode and an anvil. This is also given in table 1. In the case of sealing with hot air, the fixing elements are clamping jaws and the planar composite was warmed at the locations to be sealed by blowing with hot air before the pressing.

TABLE 1

Number of leaking sealing seams in the head region 112 according to the leakproofness method as dependent on the type of sealing method, arrangement of the sonotrode and arrangement of the recess 213, as well as service life of the sonotrode.

| | Sealing method | Sonotrode contact | Recess contact | Leaking sealing seams | Discolourations composite region 107 or 108 | Service life of the sonotrode |
|---|---|---|---|---|---|---|
| Example 1 | Hot air | / | with layer 205 | 153 | 0 | / |
| Example 2 | Ultrasonic | with layer 205 | with layer 205 | 2 | 2 | — |

TABLE 1-continued

Number of leaking sealing seams in the head region 112 according to the leakproofness method as dependent on the type of sealing method, arrangement of the sonotrode and arrangement of the recess 213, as well as service life of the sonotrode.

| | Sealing method | Sonotrode contact | Recess contact | Leaking sealing seams | Discolourations composite region 107 or 108 | Service life of the sonotrode |
|---|---|---|---|---|---|---|
| Example 3 | Ultrasonic | with layer 212 | with layer 205 | 0 | 0 | + |
| Comparative example 1 | Hot air | / | with layer 212 | 284 | 0 | / |
| Comparative example 2 | Ultrasonic | with layer 212 | with layer 212 | 10 | 5 | − |
| Comparative example 3 | Ultrasonic | with layer 205 | with layer 212 | 8 | 8 | + |

A "+" in table 1 signifies a longer service life of the sonotrode than a "−". Here, a sonotrode of a titanium alloy was employed continuously in the running production operation until it had to be replaced due to fracture build up in the sonotrode body. Table 1 shows that the service life of the sonotrode is longer if the recess is located in the anvil and not in the sonotrode. Generally, the leakproofness of the head seam is better when sealed with ultrasound than with hot air. If hot air is employed channels relatively often form in the sealed composite. Leakage occurs through these channels. If ultrasound is employed, the formation of such channels can be virtually prevented. Instead, discolourations can occur, in particular due to too much heating locally of individual laminate regions. These represent a further source of leakages, however they occur significantly less frequently than the channels from heating with hot air. Furthermore, the occurrence of discolourations and thus the number of leaking head seams can be reduced if the recess is located in the anvil and not in the sonotrode. Furthermore, it can be seen in table 1 that for the same sealing method, and in the case of ultrasound, constant arrangement of the recess in the anvil or sonotrode, an arrangement of the recess on the side of the laminate which is not thickened by the longitudinal seam (in FIG. 2 the lower side) can lead to sealing seams in the head region which leak less. This effect is clear from a comparison of example 1 with comparative example 1, example 2 with comparative example 2 and example 3 with comparative example 3. As can be seen in table 1, inventive example 3 provides the best results overall.

BRIEF DESCRIPTION OF THE FIGURES

The figures show:
FIG. 3A a diagram of a plan view of a further fixing surface according to the invention;
FIG. 3B a diagram of a plan view of a further fixing surface according to the invention;
FIG. 3C a diagram of a plan view of a further fixing surface according to the invention;
FIG. 4 a flow diagram of a method according to the invention;
FIG. 5 a diagram of a cross-section of a planar composite provided for a method according to the invention;
FIG. 6A illustration of method step i) of a method according to the invention;
FIG. 6B illustration of method step ii) of a method according to the invention;
FIG. 6C illustration of method step iii) of a method according to the invention;
FIG. 6D illustration of method step iv) of a method according to the invention;
FIG. 6E illustration of method step v) of a method according to the invention;
FIG. 6F illustration of method step vi) of a method according to the invention;
FIG. 7 diagram of a closed container according to the invention;
FIG. 8A a diagram of a further closed container according to the invention;
FIG. 8B a diagram of a cross-section through the seam and the depression of the closed container in FIG. 8A;
and
FIG. 9 a diagram of a longitudinal section through the seam and the depression of the closed container in FIG. 8A;

DETAILED DESCRIPTION OF THE FIGURES

Figure 1C:
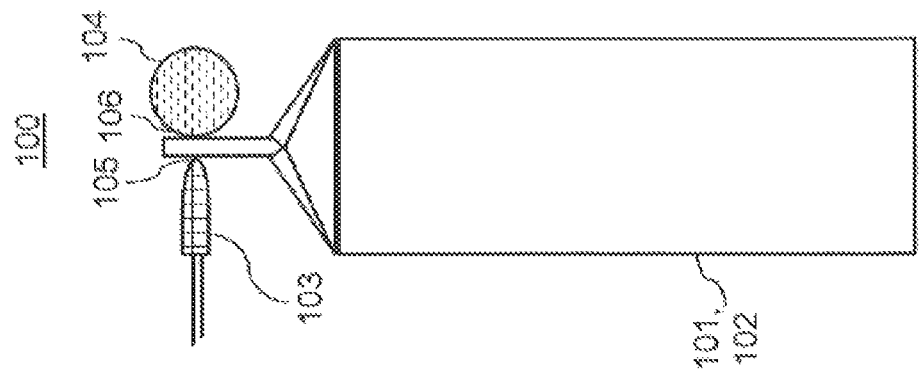
FIG. 1C a diagram of a further device according to the invention comprising a container precursor.
Figure 1B:
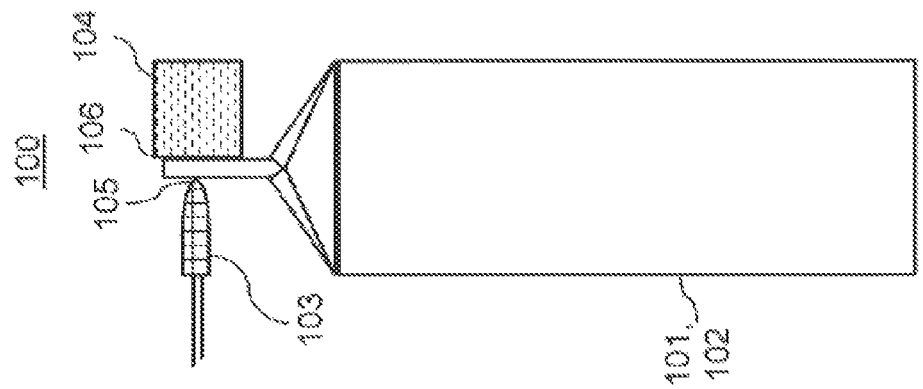
FIG. 1B a diagram of a device according to the invention comprising a container precursor.
Figure 1A:
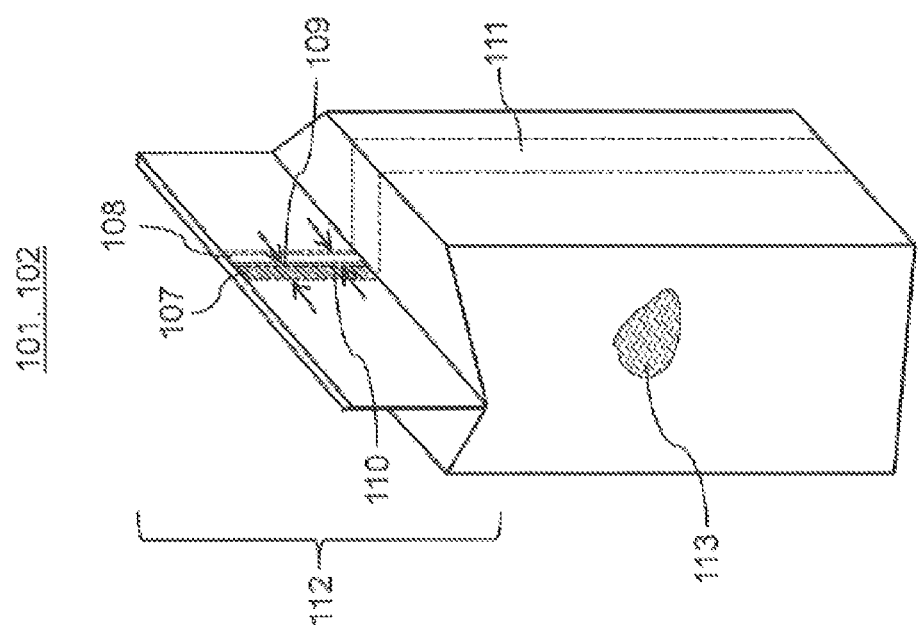
FIG. 1A a diagram of a container precursor comprising a first composite region according to the invention and a second composite region according to the invention.

FIG. 1A shows a diagram of a container precursor 102. This comprises a folded planar composite 101 which is a constituent of a device 100 according to the invention in FIG. 1B. Furthermore the container precursor 102 surrounds an interior 113, which contains a foodstuff. In a head region 112, also called gable region, the container precursor 102 comprises a first composite region 107 and a further composite region 108. The first composite region 107 has a first width 109 of 5.5 mm. The further composite region 108 has a second width 110 of 5 mm. The first composite region 107 and the further composite region 108 are included in a longitudinal seam 111 of the container precursor 102. The longitudinal seam 111 extends over an entire length of the container precursor 102. Along the longitudinal seam 111 opposite ends of the folded planar composite 101 are joined to one another in order thus to form the container precursor 102. Furthermore, the container precursor 102 comprises a closed base region. By closing the head region 112 using the device 100 according to the invention in FIG. 1B, a closed container 700 (see FIG. 7) according to the invention can be produced from the container precursor 102.

FIG. 1B shows a diagram of a device 100 according to the invention comprising the container precursor 102 in FIG. 1A. In addition to the container precursor 102 from the folded planar composite 101, the device 100 further comprises a first fixing element 103 and a further fixing element 104. The first fixing element 103 is a sonotrode made of a titanium alloy. The further fixing element 104 is an anvil for the sonotrode. The planar composite 101 is clamped in the head region 112 of the container precursor 102 between a first fixing surface 105 of the sonotrode and a further fixing surface 106 of the anvil and is thus fixed. The anvil is constructed as a prism-shaped bar with a square base area, wherein the bar extends longitudinally perpendicularly to the plane of the diagram. The further fixing surface 106 is accordingly flat in construction. The sonotrode is constructed blade-like, wherein a blunt "knife edge" of the "blade" is the first fixing surface 105.

FIG. 1C shows a diagram of a further device 100 according to the invention comprising a container precursor 102. The device 100 in FIG. 1C is identical to the device 100 in FIG. 1B, apart from the fact that in FIG. 1C the further fixing element 104 is constructed as a circular tube. The further fixing surface 106 accordingly is not flat, but is constructed as part of a generated surface of the circular tube. The circular tube extends longitudinally in the direction perpendicular to the plane of the diagram.

Figure 2:
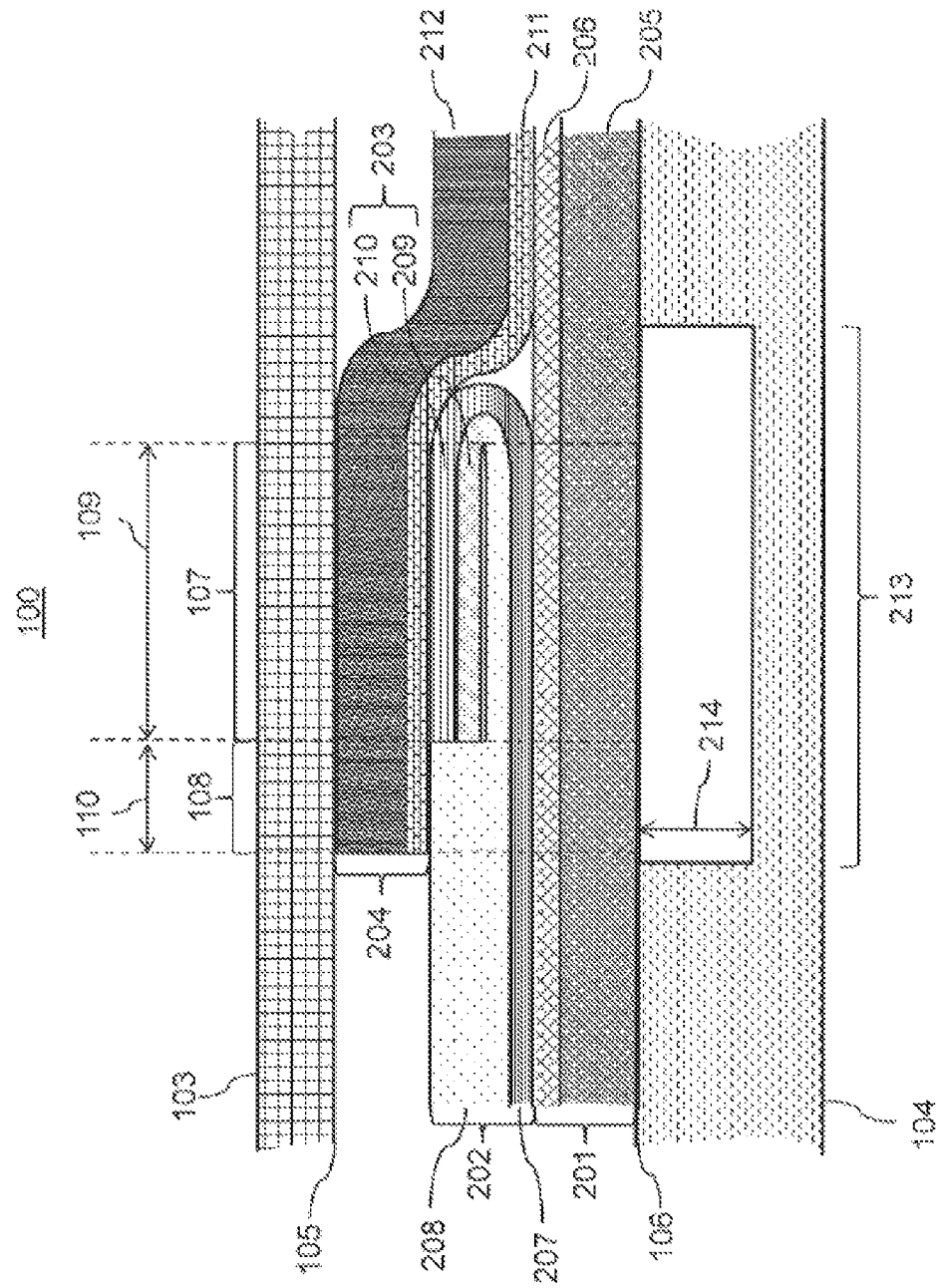
FIG. 2 a diagram of a cross-section of a device according to the invention.

FIG. 2 shows a diagram of a cross-section of the device 100 according to the invention from FIG. 1B. FIG. 2 shows in cross-section the region in the head region 112 of the planar composite 101 which is fixed between the first fixing surface 105 of the sonotrode and the further fixing surface 106 of the anvil. The folded planar composite 101 comprises, as shown in FIG. 1A, a first composite region 107 and a further composite region 108, both of which are included in the longitudinal seam 111 of the container precursor 102 in FIG. 1A. The first composite region 107 comprises a first layer sequence comprising as layers superimposing one another in the direction from the further fixing surface 106 to the first fixing surface 105 a first composite layer 201, a second composite layer 202, a third composite layer 203 and a fourth composite layer 204. The first composite layer 201 comprises as the first composite layer sequence in the direction from the further fixing surface 106 to the first fixing surface 105 a first polyethylene layer (not shown), a first carrier layer 205, a second polyethylene layer (not shown), a first barrier layer 206 and a third polyethylene layer. The second composite layer 202 comprises as the second composite layer sequence in the direction from the further fixing surface 106 to the first fixing surface 105 a first polyethylene layer (not shown), a second barrier layer 207, a second polyethylene layer (not shown) and a second carrier layer 208. The third composite layer 203 comprises as the third composite layer sequence in the direction from the further fixing surface 106 to the first fixing surface 105 a third carrier layer 209, a first polyethylene layer (not shown), a third barrier layer 210 and a second polyethylene layer (not shown). The fourth composite layer 204 comprises as the fourth composite layer sequence in the direction from the further fixing surface 106 to the first fixing surface 105 a first polyethylene layer (not shown), a fourth barrier layer 211, a second polyethylene layer (not shown), a fourth carrier layer 212 and a third polyethylene layer (not shown). In the first composite region 107 the second composite layer 202 and the third composite layer 203 are not joined to one another. Between these two layers there is a hollow space, and no further layer of the planar composite 101. Furthermore, the third composite layer 203 is joined to the fourth composite layer 204 by sealing of the second polyethylene layer of the third composite layer 203 and the first polyethylene layer of the fourth composite layer 204. In the first composite region the second carrier layer 208 and the third carrier layer 209 are each characterised by a layer thickness which is smaller by a factor of 0.5 than in each case the first carrier layer 205 and the fourth carrier layer 212. The second composite region 108 comprises a second layer sequence comprising as layers superimposing one another in the direction from the further fixing surface 106 to the first fixing surface 105 the first composite layer 201, the second composite layer 202 and the fourth composite layer 204. In the second composite region 108 the third composite layer 203 is joined to the fourth composite layer 204 by sealing of the second polyethylene layer of the third composite layer 203 and the first polyethylene layer of the fourth composite layer 204. In the second composite region 108 the second carrier layer 208 is characterised by a layer thickness which is greater by a factor of 2 than the layer thickness of the same second carrier layer 208 in the first composite region 107. The second composite layer 202 passes into the third composite 203 at the fold point shown in FIG. 2. In the first composite region 107 and in the further composite region 108 the four composite layers 201, 202, 203 and 204, however, do not pass into one another in such a way but as described above form a layer sequence in each composite region 107, 108. In the first composite region 107 the second carrier layer 208 and the third carrier layer 209 are skived, but not the first carrier layer 205 and the fourth carrier layer 212. In the second composite region 108, none of the above mentioned carrier layers are skived. All the barrier layers 206, 207, 210, 211 occurring in FIG. 2 are made of aluminium EN A W 8079 from Hydro Aluminium Deutschland GmbH. These barrier layers 206, 207, 210, 211 in each case have a layer thickness of 6 μm and are constructed in one piece with one another. These barrier layers 206, 207, 210, 211 belong to the planar composite 101 and in each case pass into one another at folds. For the second barrier layer 207 and the third barrier layer 210 this is shown with the fold in FIG. 2. Similarly, all the carrier layers 205, 208, 209, 212 occurring in FIG. 2 are constructed in one piece with one another. These carrier layers 205, 208, 209, 212 belong to the planar composite 101 and in each case pass into one another at folds. For the second carrier layer 208 and the third carrier layer 209 this is shown with the fold in FIG. 2. Further folds of the planar composite 101 are not shown in FIG. 2, but can be seen from FIG. 1A. For production of the container precursor 102 in FIG. 1A, a carrier material (Stora Enso Natura T Duplex Doppelstrich from Stora Enso Oyj AG, Scott bond value of 200 J/m$^2$, residual moisture content 7.5%) with in each case a "coat" on both carrier sides was used. Both layer surfaces of each carrier layer 205, 208, 209, 212 in FIG. 2 accordingly in principle comprise a "coat". However, skived layer surfaces comprise no "coat". The layer surface of the second carrier layer 216 facing the third carrier layer 207 thus comprises no "coat" in the first composite region 107. Furthermore, in the first composite region 107 the layer surface of the third carrier layer 209 facing the second carrier layer 208 comprises no "coat". All the abovementioned polyethylene layers are made of LDPE 19N430 from Ineos Köln GmbH. The further fixing element 104, the anvil, comprises a recess 213, which is a depression in the further fixing surface 106. The first composite region 107 and the further composition region 108 are located between the recess 213 and the first fixing surface 105 in such a way that on pressing the planar composite 101 between the first fixing surface 105 and the further fixing surface 106 a part of each of the layer sequences of the first composite region 107 and of the further composite region 108 are pressed into the recess 213. It is to be noted here that a thickened side of the longitudinal seam 111, in FIG. 2 the upper side of the planar composite 101, is not facing the further fixing surface 106 with the recess 213, but rather is facing the first fixing surface 105, which comprises no recess 213.

FIG. 3A shows a diagram of a plan view of further fixing surface 106 of a further fixing element 104 according to the invention. The further fixing surface 106 is a rectangular flat side surface of a parallelepipedal further fixing element 104. The further fixing surface 106 comprises a recess 213, which extends from one edge of the further fixing element 104 to an opposite edge. The recess 213 has a length 301 in the direction of a circumference of the further fixing element 104. The length 301 is 30% of the circumference. Furthermore, the recess 213 has a width 302.

FIG. 3B shows a diagram of a plan view of a further fixing surface 106 according to the invention of a further fixing element 104. The further fixing surface 106 is a rectangular flat side surface of a parallelepipedal further fixing element 104. The further fixing surface 106 comprises a recess 213, which extends from one edge of the further fixing element 104 not as far as an opposite edge. The recess 213 has a length 301 in the direction of a circumference of the further fixing element 104. The length 301 is 20% of the circumference. Furthermore, the recess 213 has a width 302.

FIG. 3C shows a diagram of a plan view of a further fixing surface 106 according to the invention of a further fixing element 104. The further fixing surface 106 is a rectangular flat side surface of a parallelepipedal further fixing element 104. The further fixing surface 106 comprises a recess 213, which extends from one edge of the further fixing element 104 to an opposite edge. The recess 213 has a length 301 in the direction of a circumference of the further fixing element 104. The length 301 is 30% of the circumference. Furthermore, the recess 213 has a width 302 which becomes smaller along the circumference. The recess 213 further is bordered on sides of the recess 213 opposite one another by a first edge 803 and a further edge 303. The first edge 304 comprises a straight first edge section 304 and the further edge 303 comprises a straight further edge section 303. The straight first edge section 304 and the straight further edge section 303 enclose an angle 305 of 20°.

FIG. 4 shows a flow diagram of a method 400 according to the invention. The closed container 700 in FIG. 7 can be produced by the method 400. The method 400 comprises a method step a) 401: providing a folded planar composite 101 according to FIG. 5. In a method step b) 402 a first fixing element 103 comprising a first fixing surface 105 and a further fixing element 104 comprising a further fixing surface 106 are provided. The first fixing element 103 is a sonotrode made of a titanium alloy. The further fixing element 104 is an anvil for the sonotrode. The further fixing surface 106 here comprises a recess 213. In a method step c) 403 the fourth composite layer 204 of the planar composite 101 and the first fixing surface 105, as well as the first composite layer 201 and the further fixing surface 106, as well as the first composite layer 201 and the second composite layer 202 are in each case brought into contact with one another by pressing the planar composite 101 between the first fixing surface 105 and the further fixing surface 106. The first composite region 107 and the further composite region 108 here are located between or in the recess 213 and the first fixing surface 105. The arrangement of the planar composite 101 and the two fixing elements 103, 104 during the bringing into contact of method step c) 403 corresponds to the arrangement of the device 100 in FIG. 2. In a method step d) 404 the first composite layer 201 is joined to the second composite layer 202. For this an ultrasonic vibration is transferred from the sonotrode to the planar composite 101. The ultrasonic vibration is excited at 30 kHz and an amplitude of 10 μm for 200 ms. By this means the third polyethylene layer of the first composite layer 201, i.e. the polyethylene layer which superimposes the first barrier layer 206 on one side facing away from the first carrier layer 205, is heated to a temperature above its melting temperature. The joining is accordingly a sealing with this polyethylene layer. By this sealing the head region 112 of the container precursor 102 is closed and a closed container 700 is thus obtained.

FIG. 5 shows a diagram of a cross-section of a folded planar composite 101 provided for the method 400 according to the invention from FIG. 4. The folded planar composite 101 is folded and sealed such that it forms a container precursor 102 according to FIG. 1A having a longitudinal seam 111. The container precursor 102 here is open in its head region 112. The folded planar composite 101 comprises a first composite layer 201, a second composite layer 202, a third composite layer 203, a fourth composite layer 204 and a first composite region 107, and a further composite region 108. The first composite region 107 has a first width 109 of 6 mm. The further composite region 108 has a second width 110 of 4 mm. Between the first composite layer 201 and the second composite 202 is located an intermediate region 500. As a result of this the container precursor 102, as mentioned above, is open in its head region 112. A person viewing FIG. 5 accordingly is looking into the opened container precursor 102 when looking at the intermediate region 500. The structure of the four composite layers 201, 202, 203, 204 corresponds to the structure of the composite layers 201, 202, 203, 204 of the same name in FIG. 2. The first composite region 107 comprises a first layer sequence, comprising as layers superimposing one another in the direction from the intermediate region 500 through the first layer sequence, the second composite layer 202, the third composite layer 203 and the fourth composite layer 204. In the first composite region 107 the second composite layer 202 is not joined to the third composite layer 203. However, the third composite layer 203 is joined sealed to the fourth composite layer 204. In the first composite region 107 each of the second carrier layer 208 and the third carrier layer 209 are characterised by a smaller layer thickness than in each case the first carrier layer 205 and the fourth carrier layer 212. The further composite region 108 comprises a second layer sequence, comprising as layers superimposing one another in the direction from the intermediate region 500 through the second layer sequence, the second composite layer 202 and the fourth composite layer 204. In the further composite region 108 the second composite layer 202 is sealed joined to the fourth composite layer 204. In the further composite region 108, the second carrier layer 208 is characterised by a greater layer thickness than in the first composite region 107. The first composite region 107 is adjacent to the further composite region 108.

FIG. 6A shows a diagram of a method step i) of a method 400 according to the invention. In method step i) a planar composite 101 is provided. The planar composite 101 comprises a layer sequence 601. The layer sequence 601 comprises as layers superimposing one another a composite carrier layer 605 and a composite barrier layer 604. The composite barrier layer 604 is an aluminium layer (aluminium EN A W 8079 from Hydro Aluminium Deutschland GmbH). The composite carrier layer 605 is a cardboard layer (Stora Enso Natura T Duplex Doppelstrich from Stora Enso Oyj AG, Scott bond value of 200 J/m2, residual moisture content 7.5%). Between the composite carrier layer 605 and the composite barrier layer 604 is located a polyethylene layer (not shown, LDPE 19N430 from Ineos Köln GmbH). The planar composite 101 can be divided into an edge region 603 and an inside region 602. The edge region 603 is adjacent to the inside region 602 at the broken line in FIG. 6A. In the inside region 602 the planar composite 101 comprises a crease 606. Providing of the planar composite 101 in method step a) 401 of a method 400 according to the invention is realised by method steps i) to vi) illustrated in FIGS. 6A to 6F.

FIG. 6B shows a diagram of a method step ii) of a method 400 according to the invention. The method 400 is the same method 400 as in FIG. 6A. Method step ii) comprises reducing a layer thickness of the composite carrier layer 605 in the edge region 603. The reducing is carried out here as skiving of the composite carrier layer 605 with a rotating cup blade. This is carried out with a skiving tool model VN 50 from Fortuna Spezialmaschinen GmbH, Weil der Stadt, Germany. The layer thickness of the composite carrier layer 605 is thereby reduced by 50% of the original layer thickness.

FIG. 6C shows a diagram of a method step iii) of a method 400 according to the invention. The method 400 is the same method 400 as in FIG. 6A. In method step iii) a fold 607 is produced in the edge region 603 and a first edge fold region 608 and a further edge fold region 609 are thus obtained. The first edge fold region 608 and the further edge fold region 609 are adjacent to one another along the fold 607.

FIG. 6D shows a diagram of a method step iv) of a method 400 according to the invention. The method 400 is the same method 400 as in FIG. 6A. Method step iv) comprises bringing into contact a surface of the first edge fold region 608 with a surface of the further edge fold region 609. For this, the first edge fold region 608 is folded over along the fold 607 and laid and pressed onto the further edge fold region 609.

FIG. 6E shows a diagram of a method step v) of a method 400 according to the invention. The method 400 is the same method 400 as in FIG. 6A. Method step v) comprises producing a further fold 610 along the crease 606 in the inside region 602 thereby obtaining a first composite fold region 611 and a further composite fold region 612. The further composite fold region 612 here comprises a part 613 of the inside region 602.

FIG. 6F shows a diagram of a method step vi) of a method 400 according to the invention. The method 400 is the same method 400 as in FIG. 6A. Method step vi) comprises joining the first composite fold region 611 to the further edge fold region 609 and the part 613 of the inside region 602. The joining is thereby effected as a sealing. The sealing is carried out as bringing into contact, heating to a sealing temperature and pressing. The heating is carried out here by blowing on hot air. A container precursor 102 is thus produced in method steps i) to vi) of the method 400 by folding the planar composite 101 and producing a longitudinal seam 111.

FIG. 7 shows a diagram of a closed container 700 according to the invention. The closed container 700 is obtainable by the method 400 in FIG. 4. The closed container 700 is made of a folded planar composite 101 constructed in one piece. The closed container 700 surrounds an interior 113 which contains a foodstuff. The container 700 has been closed in its head region 112 by the method 400 in FIG. 4. This closing was effected by ultrasonic sealing and therefore production of a head seam 701.

FIG. 8A shows a diagram of a further closed container 800 according to the invention. This is made of a folded planar composite 101. Furthermore, the container 800 surrounds an interior 113 which contains a foodstuff. In a head region 112, also called gable region, closed via a seam 802 the container 800 comprises a first composite region 107 and a further composite region 108. The first composite region 107 has a first width 109 of 6.5 mm. The further composite region 108 has a further width 110 of 4 mm. The first composite region 107 and the further composite region 108 are included in a longitudinal seam 111 of the container 1300. The longitudinal seam 111 extends over an entire length of the container 800. Along the longitudinal seam 111 opposite ends of the folded planar composite 101 are joined to one another in order thus to form the container 800. A depression 801 in the planar composite 101, more precisely in a first seam region 801 of the planar composite 101, runs along the seam 802 (shown in FIG. 8B). The seam 802 and the depression 801 cross the longitudinal seam 111. The depression 801 has a width of 3 mm. The folded planar composite 101 surrounds the interior 113 on all sides, the planar composite 101 being constructed in one piece.

FIG. 8B shows a diagram of a cross-section through the seam 802 and the depression 801 of the closed container 800 in FIG. 8A. The depression 801 has a depth of 0.5 mm. A first seam region 803 and a further seam region 804 are joined to one another along the seam 802. The first seam region 803 has the depression 801 along the seam 802.

FIG. 9 shows a diagram of a longitudinal section through the seam 802 and the depression 801 of the closed container 800 in FIG. 8A. The further seam region 804 comprises a first composite layer 201. The first seam region 803 comprises a second composite layer 202, a third composite layer 203, a fourth composite layer 204 and a first composite region 107, and a further composite region 108. Between the first composite layer 201 and the second composite layer 202 is located the seam 802, which is made of sealed polyethylene (LDPE 19N430 from Ineos Köln GmbH). The first composite region 107 has a first width 109. The further composite region 108 has a further width 110. The structure of the four composite layers 201, 202, 203, 204 corresponds to the structure of the composite layers 201, 202, 203, 204 of the same name in FIG. 2. The first composite region 107 comprises a first layer sequence, comprising as layers superimposing one another in the direction from the seam 802 through the first layer sequence, the second composite layer 202, the third composite layer 203 and the fourth composite layer 204. In the first composite region 107 the second composite layer 202 is not joined to the third composite layer 203 and the third composite layer 203 is joined to the fourth composite layer 204. With respect to the first composite region 107 the second carrier layer 208 and the third carrier layer 209 are characterised by a smaller layer thickness than the fourth carrier layer 212. The further composite region 108 comprises a second layer sequence, comprising as layers superimposing one another in the direction from the seam 802 through the second layer sequence, the second composite layer 202 and the fourth composite layer 204. In the further composite region 108 the second composite layer 202 is joined to the fourth composite layer 204. With respect to the further composite region 108 the second carrier layer 208 is characterised by a greater layer thickness in the first composite region 107. The first composite region 107 is adjacent to the further composite region 108.

LIST OF REFERENCE SYMBOLS

100 Device according to the invention
101 Planar composite

102 Container precursor
103 First fixing element
104 Further fixing element
105 First fixing surface
106 Further fixing surface
107 First composite region
108 Second composite region
109 First width
110 Further width
111 Longitudinal seam
112 Head region
113 Interior
201 First composite layer
202 Second composite layer
203 Third composite layer
204 Fourth composite layer
205 First carrier layer
206 First barrier layer
207 Second barrier layer
208 Second carrier layer
209 Third carrier layer
210 Third barrier layer
211 Fourth barrier layer
212 Fourth carrier layer
213 Recess
214 Depth
301 Length
302 Width
303 Further edge/straight further edge region
304 First edge/straight first edge region
305 Angle
400 Method according to the invention
401 Method step a)
402 Method step b)
403 Method step c)
404 Method step d)
500 Intermediate region
601 Layer sequence
602 Inside region
603 Edge region
604 Composite barrier layer
605 Composite carrier layer
606 Crease
607 Fold
608 First edge fold region
609 Further edge fold region
610 Further fold
611 First composite fold region
612 Further composite fold region
613 Part of the inside region
700 Closed container according to the invention
701 Head seam
800 Closed container according to the invention
801 Depression
802 Seam
803 First seam region
804 Further seam region

The invention claimed is:

1. A device (100) comprising a first fixing element (103), a further fixing element (104) and a folded planar composite (101);

wherein the first fixing element (103) comprises a first fixing surface (105) and the further fixing element (104) comprises a further fixing surface (106);

wherein the folded planar composite (101) is at least partially fixed between the first fixing surface (105) and the further fixing surface (106);

wherein the folded planar composite (101) is a container precursor (102) surrounding an interior (113), and comprises a first composite region (107) and a further composite region (108) both of which belong to a longitudinal seam (111) of the container precursor (102);

wherein the first composite region (107) comprises a first layer sequence comprising, as layers superimposing one another in the direction from the further fixing surface (106) to the first fixing surface (105), a first composite layer (201), a second composite layer (202), a third composite layer (203) and a fourth composite layer (204);

wherein, in the first composite region (107), the third composite layer (203) is joined to the fourth composite layer (204);

wherein the further composite region (108) comprises a further layer sequence, comprising, as layers superimposing one another in the direction from the further fixing surface (106) to the first fixing surface (105), the first composite layer (201), the second composite layer (202) and the fourth composite layer (204);

wherein, in the further composite region (108), the second composite layer (202) is joined to the fourth composite layer (204);

wherein the further composite region (108) is adjacent to the first composite region (107);
 wherein the first composite layer (201) comprises a first carrier layer (205);

wherein the second composite layer (202) comprises a second carrier layer (208);

wherein the third composite layer (203) comprises a third carrier layer (209);

wherein the fourth composite layer (204) comprises a fourth carrier layer (212);

wherein, in the first composite region (107), the first carrier layer (205) or the fourth carrier layer (212) or each of both is characterised by a greater layer thickness than the second carrier layer (208) or the third carrier layer (209) or each of both;

wherein, in the further composite region (108), the second carrier layer (208) is characterised by a greater layer thickness than in the first composite region (107);

wherein the further fixing surface (106) comprises a recess (213);

wherein the first composite region (107) and the further composite region (108) are each at least partially located between the recess (213) and the first fixing surface (105);

wherein each of the first carrier layer (205), the second carrier layer (208), the third carrier layer (209) and the fourth carrier layer (212) comprises a cardboard which has a residual moisture content in a range from 4 to 15 wt.-%;

wherein the first fixing element (103) is a sonotrode, the further fixing element (104) is an anvil formed to include the recess (213), the first fixing surface (105) does not include a groove or recess, and the further fixing surface (106) is formed without a plurality of ribs arranged in a region of the recess (213) and a direction of which is not parallel to the longitudinal seam (111).

2. The device (100) according to claim 1, wherein the first composite layer (201) comprises, as first composite layer sequence in the direction from the further fixing surface (106) to the first fixing surface (105), the first carrier layer (205) and a first barrier layer (206);

wherein the second composite layer (202) comprises, as second composite layer sequence in the direction from the further fixing surface (106) to the first fixing surface (105), a second barrier layer (207) and the second carrier layer (208);

wherein the third composite layer (203) comprises, as third composite layer sequence in the direction from the further fixing surface (106) to the first fixing surface (105), the third carrier layer (209) and a third barrier layer (210);

wherein the fourth composite layer (204) comprises, as fourth composite layer sequence in the direction from the further fixing surface (106) to the first fixing surface (105), a fourth barrier layer (211) and the fourth carrier layer (212).

3. The device (100) according to claim 1, wherein the sonotrode comprises one selected from the group consisting of an alloy, comprising at least 90 wt.-% titanium or aluminium or both, based on the weight of the alloy; a steel; and a piezo-ceramic or a combination of at least two thereof.

4. The device (100) according to claim 1,
wherein the first composite region (107) is characterised by a first width (109);
wherein the first width (109) is in a range from 1 to 10 mm.

5. The device (100) according to claim 1, wherein the further composite region (108) is characterised by a further width (110); wherein the further width (110) is in a range from 1 to 10 mm.

6. The device (100) according to claim 1,
wherein the recess (213) is bordered on opposite sides of the recess (213) by a first edge (304) and a further edge (303);
wherein the first edge (304) comprises a straight first edge section (304);
wherein the further edge (303) comprises a straight further edge section (303);
wherein the straight first edge section (304) and the straight further edge section (303) confine an angle (305) in a range from 5 to 30°.

7. The device (100) according to claim 1, wherein, in the first composite region (107), the layer thickness of the first carrier layer (205) or of the fourth carrier layer (212) or of each of both is 1.1 to 20 times as great as the layer thickness of the second carrier layer (208) or of the third carrier layer (209) or of each of both.

8. The device (100) according to claim 1, wherein, in the further composite region (108), the layer thickness of the second carrier layer (208) is 1.1 to 20 times as great as the layer thickness of this second carrier layer (208) in the first composite region (107).

9. The device (100) according to claim 1, wherein, in the first composite region (107), the second composite layer (202) is not joined to the third composite layer (203).

10. The device (100) according to claim 1, wherein, in the first composite region (107),
a) a surface of the second carrier layer (208) which is facing the third carrier layer (209), and
b) a surface of the third carrier layer (209) which is facing the second carrier layer (208)
each comprises no top layer and is joined to no top layer.

11. The device (100) according to claim 1, wherein the folded planar composite (101) is constructed in one piece.

12. The device (100) according to claim 1, wherein the recess (213) has a depth (214) in a range from 0.1 to 5 mm.

13. The device (100) according to claim 1, wherein the further fixing surface (106) is a planar rectangular side surface and the recess (213) defines a rectangular void.

14. A method which comprises steps of providing the device (100) according to claim 1 and joining of the first composite layer (201) to the second composite layer (202).

15. A method (400) comprising as method steps (401 to 404)
a) Provision of a folded planar composite (101) which is a container precursor (102) surrounding an interior (113),
wherein the folded planar composite (101) comprises a first composite layer (201), a second composite layer (202), a third composite layer (203), a fourth composite layer (204), a first composite region (107) and a further composite region (108);
wherein the first composite region (107) and the further composite region (108) both belong to a longitudinal seam (111) of the container precursor (102);
wherein an intermediate region (500) is located between the first composite layer (201) and the second composite layer (202);
wherein the first composite layer (201) comprises a first carrier layer (205);
wherein the second composite layer (202) comprises a second carrier layer (208); wherein the third composite layer (203) comprises a third carrier layer (209);
wherein the fourth composite layer (204) comprises a fourth carrier layer (212);
wherein the first composite region (107) comprises a first layer sequence, comprising as layers superimposing one another in the direction from the intermediate region (500) through the first layer sequence, the second composite layer (202), the third composite layer (203) and the fourth composite layer (204);
wherein, in the first composite region (107), the third composite layer (203) is joined to the fourth composite layer (204);
wherein, in the first composite region (107), the first carrier layer (205) or the fourth carrier layer (212) or each of both is characterised by a greater layer thickness than the second carrier layer (208) or the third carrier layer (209) or each of both;
wherein the further composite region (108) comprises a further layer sequence, comprising as layers superimposing one another in the direction from the intermediate region (500) through the further layer sequence, the second composite layer (202) and the fourth composite layer (204);
wherein, in the further composite region (108), the second composite layer (202) is joined to the fourth composite layer (204);
wherein, in the further composite region (108), the second carrier layer (208) is characterised by a greater layer thickness than in the first composite region (107);
wherein each of the first carrier layer (205), the second carrier layer (208), the third carrier layer (209) and the fourth carrier layer (212) comprises a cardboard which has a residual moisture content in a range from 4 to 15 wt.-%;
b) Provision of a first fixing element (103), comprising a first fixing surface (105), and a further fixing element (104), comprising a further fixing surface (106);

wherein the further fixing surface (106) comprises a recess (213);

wherein the first fixing element (103) is a sonotrode, the further fixing element (104) is an anvil formed to include the recess (213), and the first fixing surface (105) does not include a groove or recess;

c) Contacting the fourth composite layer (204) with the first fixing surface (105), the first composite layer (201) with the further fixing surface (106), and the first composite layer (201) with the second composite layer (202);

wherein the first composite region (107) and the further composite region (108) are each at least partially located between the recess (213) and the first fixing surface (105); and d) Joining the first composite layer (201) to the second composite layer (202);

wherein in step d), the further fixing surface (106) is formed without a plurality of ribs which are arranged in a region of the recess (213) and a direction of which is not parallel to the longitudinal seam (111).

16. The method (400) according to claim 15, wherein, in method step d) (404), the first fixing surface (105) or the further fixing surface (106) or both vibrates against the planar composite (101) with a) a frequency in a range from 10 to 50 kHz, or
b) an amplitude in a range from 3 to 20 μm, or
c) both.

17. The method (400) according to claim 15, wherein, in method step d) (404), the joining is a sealing by transfer of an ultrasonic vibration from the first fixing element (103) or from the further fixing element (104) or from both to the folded planar composite (101).

18. The method (400) according to claim 17, wherein the ultrasonic vibration is excited for a duration in a range of from 50 to 500 ms.

19. The method (400) according to claim 15,
wherein, in method step d) (404), the joining is a closing of the container precursor (102).

20. The method (400) according to claim 19, wherein, before method step c) (403), a foodstuff is introduced into the container precursor (102).

21. The method (400) according to claim 19, wherein, in method step d) (404), a closed container (700) is obtained,
wherein the closed container (700) is autoclaved or pasteurised or both.

22. The method (400) according to claim 21, wherein, before method step c), (403) the container precursor (102) is sterilised.

* * * * *